(12) United States Patent
Steinke

(10) Patent No.: US 6,473,482 B1
(45) Date of Patent: Oct. 29, 2002

(54) SPACER WITH SPECIALLY FASTENED SPRINGS FOR FUEL ASSEMBLIES OF NUCLEAR REACTORS

(75) Inventor: Alexander Steinke, Ebermannstadt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/354,135

(22) Filed: Jul. 15, 1999

Related U.S. Application Data

(63) Continuation of application No. PCT/EP97/00157, filed on Jan. 15, 1997.

(51) Int. Cl.[7] .................................................. G21C 3/18
(52) U.S. Cl. ........................ 376/442; 376/441; 376/438; 376/448
(58) Field of Search ................................. 376/438, 441, 376/442, 448

(56) References Cited

U.S. PATENT DOCUMENTS

| | | | | |
|---|---|---|---|---|
| 3,679,546 A | * | 7/1972 | Muellner ..................... | 376/441 |
| 3,769,159 A | * | 10/1973 | Zinn et al. ................... | 376/438 |
| 4,152,205 A | * | 5/1979 | Kropfl ......................... | 376/441 |
| 4,411,862 A | * | 10/1983 | Leclerq et al. .............. | 376/442 |
| 4,578,239 A | * | 3/1986 | Steinke ....................... | 376/442 |
| 4,879,090 A | * | 11/1989 | Perrotti et al. .............. | 376/462 |
| 5,069,864 A | * | 12/1991 | Johansson ................... | 376/441 |
| 5,091,145 A | * | 2/1992 | Petit ............................ | 376/438 |
| 5,188,798 A | * | 2/1993 | Okuyama et al. ........... | 376/442 |
| 5,209,899 A | * | 5/1993 | Johansson et al. .......... | 376/442 |
| 5,311,564 A | * | 5/1994 | Steinke ....................... | 376/442 |
| 5,539,792 A | * | 7/1996 | Buttner et al. ............... | 376/438 |
| 5,566,217 A | * | 10/1996 | Croteau et al. ............. | 376/438 |
| 5,732,116 A | * | 3/1998 | Petit ............................ | 376/441 |
| 5,966,419 A | * | 10/1999 | Petit ............................ | 376/441 |

FOREIGN PATENT DOCUMENTS

| | | | | |
|---|---|---|---|---|
| DE | 2631925 | * | 1/1978 | ............ G21C/3/34 |
| DE | 2644297 | | 4/1978 | |
| EP | 0027203 | * | 9/1980 | ............ G12C/3/34 |
| EP | 0027203 A1 | | 4/1981 | |
| EP | 0395509 | * | 4/1990 | ........... G12C/3/356 |
| EP | 0395509 A1 | | 10/1990 | |
| EP | 0527244 A1 | | 2/1993 | |
| FR | 2366669 | | 4/1978 | |

OTHER PUBLICATIONS

Published International Application No. 94/09495 (Büttner et al.), dated Apr. 28, 1994.

* cited by examiner

*Primary Examiner*—Michael J. Carone
*Assistant Examiner*—John Richardson
(74) *Attorney, Agent, or Firm*—Laurence A. Greenberg; Werner H. Stemer; Ralph E. Locher

(57) ABSTRACT

A spacer for a fuel assembly of a nuclear reactor includes an elongated spring which is held in a mesh in such a way that there is structural freedom with respect to a selection of a shape of the spring and that little spring material is required. Two lateral rims at a top end of the spring are bent around a center of a fuel element out of the mesh in such a way that they protrude through an assembly opening in the web into an adjacent mesh. The two rims approximately form-lockingly encompass an edge of the assembly opening through the use of a profiled section. A lower end of the spring is also correspondingly held on the web through the use of profiled sections on its two rims, which are bent outward. Two springs protruding into adjacent meshes can then also be fastened in the same assembly opening.

35 Claims, 14 Drawing Sheets

SPACER WITH SPECIALLY FASTENED SPRINGS FOR FUEL ASSEMBLIES OF NUCLEAR REACTORS

CROSS-REFERENCE TO RELATED APPLICATION

This application is a continuation of copending International Application No. PCT/EP97/00157, filed Jan. 15, 1997, which designated the United States.

BACKGROUND OF THE INVENTION

FIELD OF THE INVENTION

The invention relates to a spacer of a fuel assembly for a light-water cooled nuclear reactor, according to European Patent Application 0 027 203 A1, corresponding to U.S. Pat. No. 4,578,239. The invention also relates to a spacer of such a fuel assembly with a pair of springs held on a common web, according to U.S. Pat. No. 3,679,546.

In fuel assemblies which are subjected to a strong cooling water flow, fuel rods that are set into powerful vibrations are therefore laterally supported in meshes of grid-shaped spacers, in order to damp those vibrations, exclude mechanical damage and hold the rods at a distance apart which is technically safe thermally. Those spacers frequently have square meshes which are formed from crossed webs and contain springs that laterally support fuel rods respectively inserted in the meshes.

A spacer formed of crossed webs is known from U.S. Pat. No. 3,679,546, in which each fuel rod of a mesh is supported by a spring formed of a long sheet-metal strip that extends parallel to a center line of the fuel rod. That sheet-metal strip has an approximately C-shaped longitudinal section with a resilient or sprung central part which merges at the top and bottom (in relation to the center line direction of the fuel rod) through the use of a convex curvature into end strips that extend along and are supported by the inside of a web forming the mesh, facing toward the fuel rod. Assembly slots extending transverse to the fuel rods are respectively associated with the two end strips and the ends of the end strips are bent in such a way that they reach through the assembly slots and are still in contact with the back of the web.

In the working position, each spring is located approximately in the center of a mesh side. The spring can be displaced laterally (i.e. along the slots) from the operating position into an assembly position. The assembly slots merge at that position into enlarged cross-sectional areas so that the bent ends of the end strips can be inserted in or extracted from the enlarged cross-sectional areas.

In order to prevent an unintentional displacement, the convex curves of the springs are configured as protrusions which, in the operating position, protrude into corresponding recesses on the upper edge and lower edge of the web but which, for assembly and dismantling, have to be bent away from the wall of the web.

Particular spring materials are necessary in order to produce the spring force necessary for optimum support of the fuel rods. However, those materials frequently have a high absorption for neutrons which are necessary in the reactor in order to maintain nuclear fission. Although relatively little material is necessary for those known springs, the spring forces which are necessary can only be achieved by special materials.

A spring is known from European Patent Application 0 527 244 A1 (corresponding to U.S. Pat. No. 5,311,564) which likewise has a C-shaped cross section but is configured as a "diagonal spring". In other words, it does not protrude into the mesh from a side surface of the mesh and at right angles to the web but instead diagonally from a corner of the mesh at which two webs cross. For that purpose, arms (end strips) of the C-shaped spring have long straps extending at right angles to the fuel rods on both sides and the two straps are formed practically into the shape of a right-angle triangle which can be inserted in the corner of the mesh. All of the straps pass through corresponding assembly openings in one of the two webs. They are held in the assembly openings of that one web and are in contact with the other web.

As compared with the spring of U.S. Pat. No. 3,679,546, it is in fact an advantageous feature that two such diagonal springs can be combined to form a double spring which protrudes into adjacent corners of two meshes located side by side. However, the way in which the springs are fastened to the mesh walls does not, in both cases, permit two such springs to be disposed in the center of a web in such a way that the two springs protrude into two adjacent meshes from the common web.

It is shown in European Patent Application 0 027 203 A1 that a fastening of straps on the rims of the end strips, similar to European Patent Application 0 527 244 A1, is also suitable for one spring which is held on a web in the center between two corners of a mesh. That spring has the features of the prior art mentioned initially above.

Those fastening straps require a relatively large amount of material which can be disadvantageous with respect to the neutron absorption as well as the natural frequency of the vibrating springs.

A similar spring with two end strips, which respectively engage in slots of a web on each side through the use of profiled sections but with which less material is required for the straps, is also presented in International Publication No. WO 94/09495, corresponding to U.S. Pat. No. 5,539,792. That spring is not associated with structural limitations with respect to the shape of the spring. Instead, the fastening is so flexible that the spring shape can be matched to the respective requirements of the reactor. In particular, therefore, the C-shape known from other documents can also be retained. However, the use of that fastening principle does not appear to be suitable for spring pairs in which the springs of the pair respectively protrude in opposite directions into the meshes, on a common web between two adjacent meshes.

It is also a disadvantage that the springs for those structures are relatively loosely seated in the openings in which their end strips are seated because it has to be easy to insert them during assembly. However, they should not be able to fall out even when no fuel rods have as yet been inserted, in the ready-for-use condition. In addition, during operation of the reactor, they should not be shaken by the cooling medium flow to such an extent that mechanical damage to the springs or the fuel rods can occur.

SUMMARY OF THE INVENTION

It is accordingly an object of the invention to provide a spacer with specially fastened springs for fuel assemblies of nuclear reactors, which overcomes the hereinafore-mentioned disadvantages of the heretofore-known devices of this general type and in which the springs have a retention on a web of the spacer that involves little material, leaves a choice of a favorable shape of the springs practically unlimited and is seated as well as possible.

With the foregoing and other objects in view there is provided, in accordance with the invention, a spacer of a fuel assembly for a light-water cooled nuclear reactor, comprising:

webs crossing each other to form meshes for inserting fuel rods having center line directions, the webs having snap-in openings formed therein, the webs having assembly openings formed therein with substantially slot-shaped opening parts having ends with edges, the assembly openings having enlarged opening parts each leading from a respective one of the substantially slot-shaped opening parts in parts of the webs, and the webs having inner surfaces facing toward the fuel rods;

a plurality of springs each held in one of the assembly openings in one of the webs, the springs having an operating position and an assembly position offset laterally relative to the operating position, and the springs having a spring force;

each of the springs having a resilient central part facing toward a fuel rod, the central part having a top and a bottom relative to the center line direction, and the central part having end strips each extending substantially parallel to a respective one of the webs and adjoining a respective one of the top and bottom; each of the end strips having two lateral rims each extending parallel to the center line direction and bent away from a fuel rod about the center line direction;

profiled sections each seated on a respective one of the rims of the end strips, the profiled sections having inner parts respectively supported on the inner surface of a respective one of the webs in the operating position of the spring, and the profiled sections having outer parts encompassing the edges at the ends of the opening parts through the substantially slot-shaped opening parts;

the outer parts of the profiled sections to be inserted in the enlarged opening parts in the parts of the webs corresponding to the assembly position of the spring and displaced from the assembly position along the slot-shaped opening parts into the operating position; and the springs having at least one part pressed by the spring force into the snap-in opening and/or the central parts of the springs and/or at least one of the end strips carrying a protuberance pointing away from a fuel rod and engaging in the snap-in opening, in the operating position of the springs with the fuel rod inserted.

In this spacer, the spring has a resilient central part which faces toward the fuel rod and on which respective end strips are adjoined at the top and the bottom, relative to the center line direction of the fuel rod. In accordance with U.S. Pat. No. 3,679,546, only the narrow rim, disposed approximately at right angles to the fuel rod, of the upper and lower end strips is bent to form a profiled section which is seated in the corresponding assembly opening and encompasses the rim of the web. However, in accordance with the invention each of the two end strips has two laterally protruding rims which are bent to form profiled sections and there are, therefore, four profiled sections for holding the spring. The rims therefore extend approximately parallel to the center line direction and are bent away from the fuel rod.

The profiled sections seated on the rims of the end strips are supported, in the assembled condition of the spacer, i.e. in the operating position of the spring, on an inner surface of a web forming the mesh and facing toward the fuel rod through the use of an inner part of each profiled section. An outer profiled section part of each profiled section protrudes through an essentially slot-shaped opening part of an assembly opening of the web. This outer profiled section part encompasses the edge of the web at the end of the respective slot.

Four slot-shaped opening parts of the assembly opening can then be provided corresponding to the four profiled sections. These opening parts lead to an enlarged cross-sectional area of the assembly opening, which is located at a position of the web which is offset laterally relative to the operating position of the spring. The spring is inserted at this laterally offset position ("assembly position of the spring") and each slot-shaped opening part therefore leads to an enlarged opening part which is shaped in such a way that the outer parts of the profiled sections, which are located on the sides of the end strips, can be inserted into the assembly opening in the assembly position of the spring. The spring which is inserted in this way can then be displaced along the slot into the operating position.

As the figures also make clear, four enlarged opening parts that are separated from one another can therefore, in particular, be provided. The enlarged opening parts are seated at the end of the four slot-shaped opening parts so that four spatially separated openings occur and form the assembly opening. It is, however, also possible for slot-shaped opening parts located one above the other to open into a common enlarged opening part. It is likewise also possible to provide for respectively associating the rims of the upper end strip with an upper common slot and the rims of the lower end strip can also engage in a common lower slot, through the use of their profiled sections.

In accordance with a special configuration of the invention, the assembly opening can then itself have a widening, i.e. an enlarged opening area, that represents a snap-in opening in which a protuberance on the central part of the spring or one of its two end strips engages and points away from the fuel rod. It is, however, also possible to provide its own snap-in opening in the web. In addition, a convex curvature of the ends of the central part or a similar part of the spring can be used instead of the protuberance for engagement of the spring. This part or the convex curvature is positively pressed into the corresponding snap-in opening as soon as the spring is seated in its assembly position and a fuel rod is inserted.

With the objects of the invention in view there is also provided a spacer of a fuel assembly for a light-water cooled nuclear reactor, comprising:

webs crossing each other to form first and second meshes for inserting fuel rods having center lines, the webs including common webs adjacent two of the meshes, the common webs having a first side surface facing toward a first one of the fuel rods and a second side surface facing toward a second one of the fuel rods, the common webs having assembly openings formed therein defining rims of the assembly openings and web edges at the rims, the assembly openings having a widened opening area at a given position on one of the webs, at least one substantially slot-shaped opening part having opening edges extending transverse to the fuel rods and end edges disposed one above the other, and the webs having snap-in openings; and first and second springs held in the assembly openings and having central parts, assembly positions, operating positions and spring forces;

a) the first spring including:

i) a first resilient central part protruding into one of the first meshes, the first resilient central part laterally supporting a first fuel rod to be inserted in the first mesh, and the first resilient central part having a top and a bottom relative to the center line of a fuel rod and two first end strips each adjoining a respective one of the top and bottom;

ii) four rims including left and right lateral rims disposed on each of the two first end strips, the four rims extending approximately parallel to the center line of the fuel rod and bent away from the first fuel rod;

iii) first profiled sections each disposed on a respective one of the four rims, each of the first profiled sections having an inner profiled section part supported on the first side surface of the common web in the operating position of the first spring, and an outer profiled section part encompassing the web edges through the assembly openings;

b) the second spring including:

i) a second resilient central part protruding into one of the second meshes, the second resilient central part laterally supporting a second fuel rod to be inserted in the second mesh, and the second resilient central part having a top and a bottom relative to the center line of a fuel rod and two second end strips each adjoining a respective one of the top and bottom;

ii) four rims including left and right lateral rims on each of the two second end strips, the four rims extending approximately parallel to the center line of the fuel rod and bent away from the second fuel rod; and iii) second profiled sections each disposed on a respective one of the four rims, each of the second profiled sections having an inner profiled section part supported on the second side surface of the common web in the operating position of the second spring, and an outer profiled section part encompassing the web edges through the assembly openings;

c) the end strips including mutually opposite upper end strips and mutually opposite lower end strips, and one of the first and an adjacent one of the second profiled sections shaped to form four profiled section pairs, in the operating position of both of the springs;

i) the outer profiled section parts of the first profiled sections to be inserted from the first side surface and the outer profiled section parts of the second profiled sections to be inserted from the second side surface, in the widened opening area in the position on the one web laterally displaced relative to the operating position of the springs;

ii) the outer profiled section parts guided in the opening edges upon laterally displacement of the springs from the assembly position into the operating position; and iii) a pair of the profiled section pairs located one above the other and positioned on the end edges upon jointly pushing the springs laterally into the operating position; and one of the springs having at least one part pressed by the spring force into the snap-in opening and/or the central part and/or at least one of the end strips of each of the springs carrying a protuberance pointing away from a fuel rod and engaging in the snap-in opening, in the operating position of both of the springs.

In this embodiment, two springs are held in an assembly opening of a web which is common to two adjacent meshes, wherein the two springs are essentially similar in construction.

The spring has a resilient central part, which protrudes into the respective mesh and laterally supports the fuel rod inserted there. An upper and a lower end strip adjoin this central strip at the top and the bottom, relative to the center line of the fuel rod. Each of the two end strips has a left-hand and right-hand lateral rim which respectively extends approximately parallel to the center line of the fuel rod and is bent away from the fuel rod. This produces four rims, with each rim carrying its own profiled section. In the operating position of the spring, an inner profiled section part of each profiled section is supported on a side surface of the common web, facing toward the fuel rod, and an outer profiled section part reaches through the assembly opening. The web edges formed by the rim of the assembly opening are therefore at least partially form-lockingly encompassed by the inner part and outer part of each profiled section. A form-locking connection is one which connects two elements together due to the shape of the elements themselves, as opposed to a force-locking connection, which locks the elements together by force external to the elements.

In the assembled condition of the spacer (operating position of both springs), the springs are located on both sides of the web and, in fact, the upper end strips are located opposite to one another and, likewise, the lower end strips are located opposite to one another. They can then be in direct contact with the side surfaces of the web or they can also be held at a small distance from the web surfaces, for example in order to generate a slight angle between the end strips and the web.

The profiled sections are then shaped in such a way that each profiled section is located at the rim of one end strip of one spring adjacent a profiled section at the rim of the opposite end strip of the other spring. Therefore, a total of four profiled section pairs are present, corresponding to the two rims of the two end strips of each spring.

In this embodiment as well, each spring is inserted in an assembly position and is only displaced into the operating position after the insertion along slot-shaped opening parts. A widened cross-sectional area, in which all of the outer profiled section parts of both springs are inserted, on the surfaces of the web, then corresponds to the assembly position. The profiled section of one spring is then introduced from one side and the profiled section of the other spring is introduced from the other side into the widened cross-sectional area. This produces a spring combination with four pairs of adjacent profiled sections (namely left upper, right upper, right lower, left lower). In order to then push the spring combination from the assembly position into the operating position, the assembly opening contains at least one essentially slot-shaped opening part. Therefore, an upper edge is present which extends transverse to the fuel rods and which is used as a guide for the two upper profiled section pairs, while a lower edge of the opening part extending transverse to the fuel rods serves as a guide for the two lower profiled section pairs.

An upper end edge and a lower end edge at the end of the slot-shaped opening part extend approximately parallel to the center line of the fuel rod, are located practically one above the other and on which an upper profiled section pair and a lower profiled section pair are then in contact as soon as the springs are jointly displaced laterally into the operating position.

In accordance with a concomitant feature of the invention, the operating position of the springs is located on the web in the center between two adjacent corners of the mesh. At least one spring part is held by the force of the springs in a snap-in opening of the web, and the spring therefore is snapped into this position, at least in the loaded condition.

Other features which are considered as characteristic for the invention are set forth in the appended claims.

Although the invention is illustrated and described herein as embodied in a spacer with specially fastened springs for fuel assemblies of nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
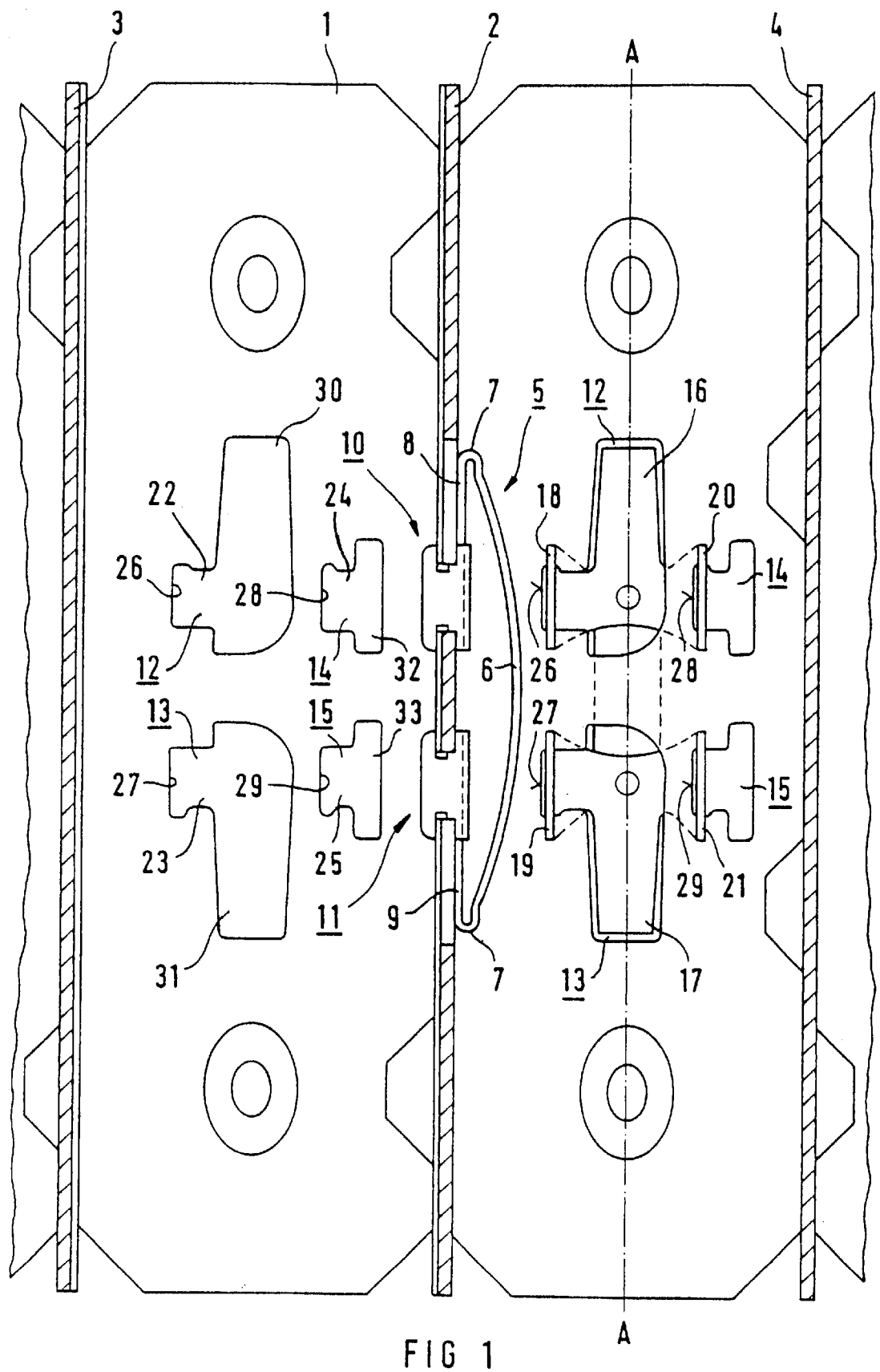
FIG. 1 is a fragmentary, diagrammatic, longitudinal-sectional view of two adjacent meshes of a spacer, in which a C-shaped spring protrudes into a right-hand mesh in accordance with the invention, and in addition outer profiled section parts on end strips of another spring can be recognized in the right-hand mesh, wherein the spring is supported on a back of a web of the mesh.

Referring now in detail to the figures of the drawings, which show embodiment examples that relate to spacers with longitudinal webs and transverse webs that form rectangular meshes, and first, particularly, to FIG. 1 thereof, there is seen a longitudinal web 1 and transverse webs 2, 3 and 4 crossing it. The webs form a left-hand mesh in which no spring has as yet been inserted, whereas in a right-hand mesh, a spring 5 protrudes out from the center of the transverse web 2. In this embodiment, a domed, resilient or sprung central part 6 merges at the top and the bottom through a convex curvature 7 into a respective upper end strip 8 and lower end strip 9. A center line of a fuel rod to be inserted in the web is designated by reference symbol A—A. In an operating position, the center line A—A is located in the center between the webs 2 and 4.

A profiled section is seated parallel to the center line A—A, on each rim of the two end strips 8, 9 of the spring 5. The spring therefore has four profiled sections of which only an upper front profiled section 10 and a lower front profiled section 11 are visible in FIG. 1. Corresponding rear profiled sections 10', 11' are covered and are therefore not shown in the drawing. In addition, the longitudinal web 1 in the right-hand part of FIG. 1 likewise carries a spring. However, that spring protrudes into a mesh located behind the longitudinal web 1 so that FIG. 1 only shows those parts of that spring (otherwise covered) which protrude through openings 12, 13, 14, 15 or are visible through these openings.

The visible parts of the (otherwise covered) spring are two end strips 16, 17 and profiled sections 18, 19, 20, 21 seated on their lateral rims. The openings 12, 13, 14, 15 are repeated in the longitudinal web in the left-hand part of FIG. 1.

Each of the openings 12, 13, 14, 15 contains a slot-shaped opening part 22, 23, 24, 25 extending in the same direction (namely to the left) transverse to the center line A—A. The profiled sections 18, 19, 20, 21 are seated on ends of the opening parts 22, 23, 24, 25. These profiled sections touch lateral end edges 26, 27, 28, 29 of the slots 22, 23, 24, 25.

Each opening part 22, 23, 24, 25 ends in an enlarged opening part 30, 31, 32, 33. In the right-hand part of FIG. 1 it may be seen that the profiled sections 18, 19, 20, 21, which protrude through the slot-shaped opening parts 22, 23, 24, 25 in the operating position of the corresponding spring, can be removed from the openings 12, 13, 14, 15 if they are displaced along the slot-shaped opening parts 22, 23, 24, 25 to the right as far as the enlarged opening parts 30, 31, 32, 33. This displaced position corresponds to an assembly position of the spring.

Figure 2:
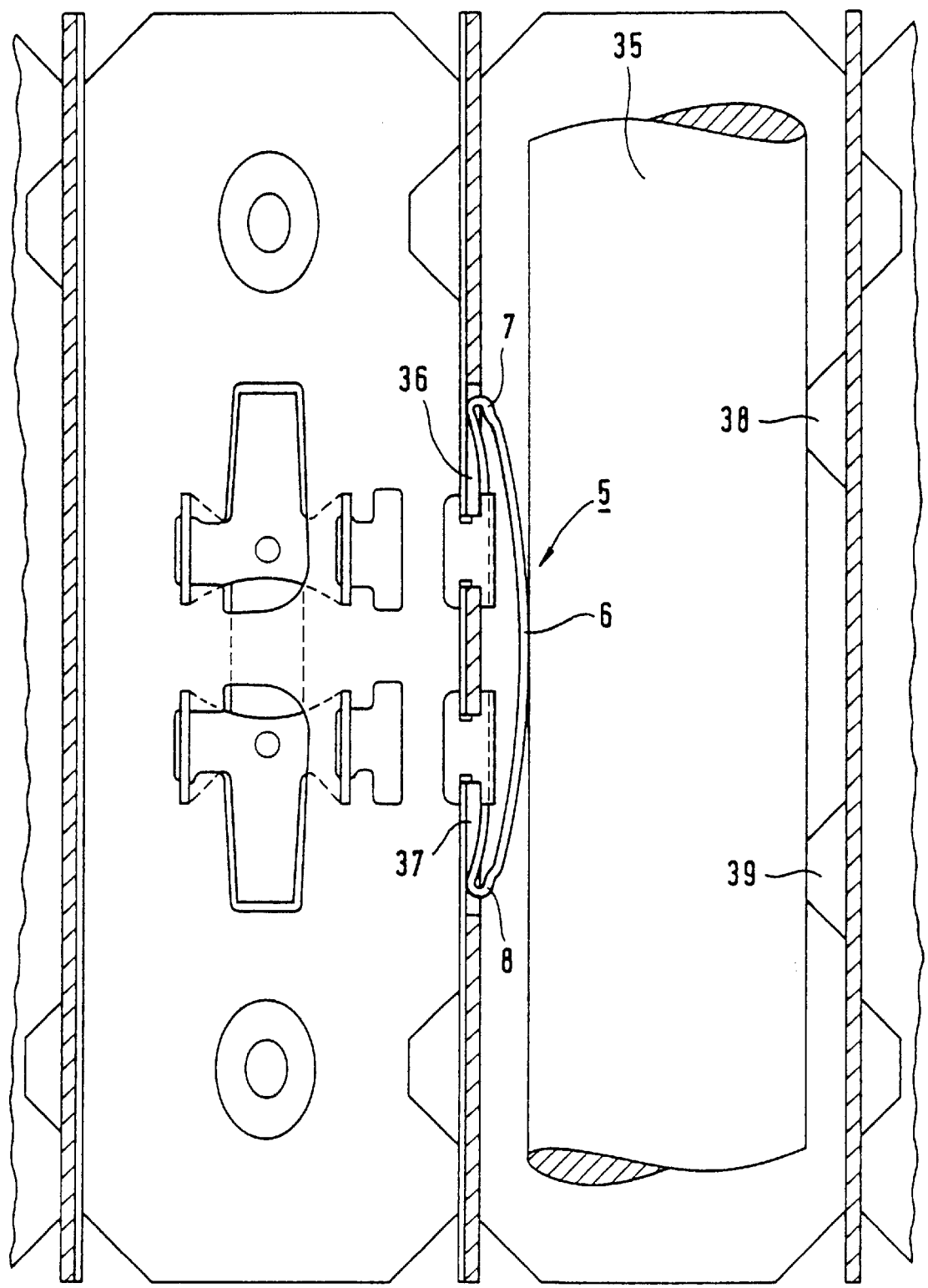
FIG. 2 is a fragmentary, longitudinal-sectional view as in FIG. 1, with a fuel rod inserted.

The slot-shaped parts of the assembly openings 12, 13, 14, 15 have a length which practically corresponds to half a distance between the profiled rims of the springs (i.e. practically half the spring width). The enlarged cross-sectional areas 30, 31 therefore come to rest in the center between the end edges 26, 28 and 27, 29 of the slots. The idea of this dimensioning is clear from FIG. 2. When a fuel rod 35 is inserted into the mesh, it presses the resilient central part 6 of the spring 5, with the connected convex curvatures 7, 8, into enlarged cross-sectional openings or snap-in openings 36, 37, which are increased in such a way that their upper edge and lower edges protrude beyond upper and lower dimensions of the spring 5.

Therefore, in this way, the convex curvatures 7, 8 are used in order to fix the spring 5 when it is loaded by a fuel rod 35 and presses the fuel rod onto corresponding holding elements (for example knobs or protuberances 38, 39 on a side of the mesh opposite to the spring).

Figure 5:
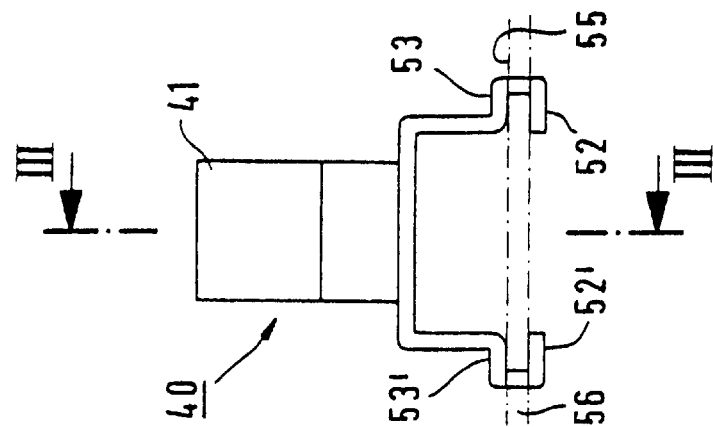
FIG. 5 is a cross-sectional view of the spring of FIG. 3.
Figure 4:
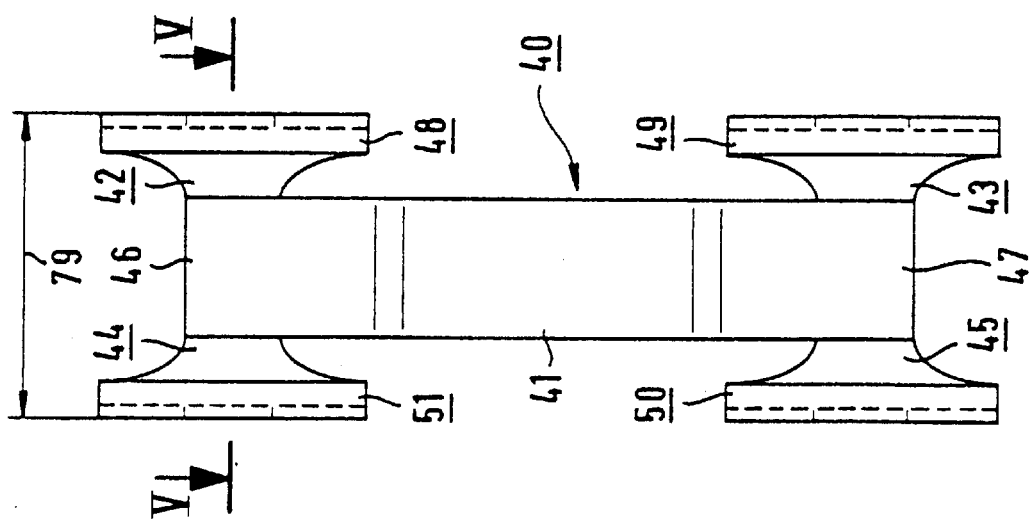
FIG. 4 is a top-plan view of the spring of FIG. 3.
Figure 3:
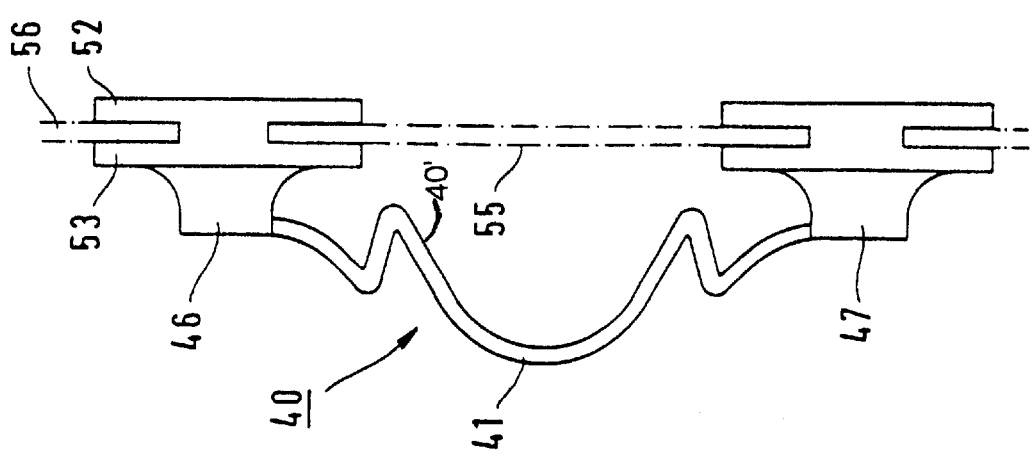
FIG. 3 is a longitudinal-sectional view taken along a line III—III in FIG. 5, in the direction of the arrows, showing a different spring which can be fastened in accordance with the invention.

Although springs with a C-shape are preferred, other spring shapes, provided they produce the desired spring force, can be combined with the fastening according to the invention. This is shown in FIGS. 3 to 5 using a spring 40 with a hat-shaped or plate-shaped central part 41. FIG. 4, in particular, shows rims 42, 43, 44, 45 on two end parts 46, 47 connected to the central part 41. These rims carry profiled sections 48, 49, 50, 51 which are in contact with respective inner parts 53, 53' on an inside surface 55 of a wall 56 (represented by interrupted lines). Outer parts 52, 52' of these profiled sections 48, 49, 50, 51 protrude through the non-illustrated assembly opening and encompass its opening rim.

Figure 6:
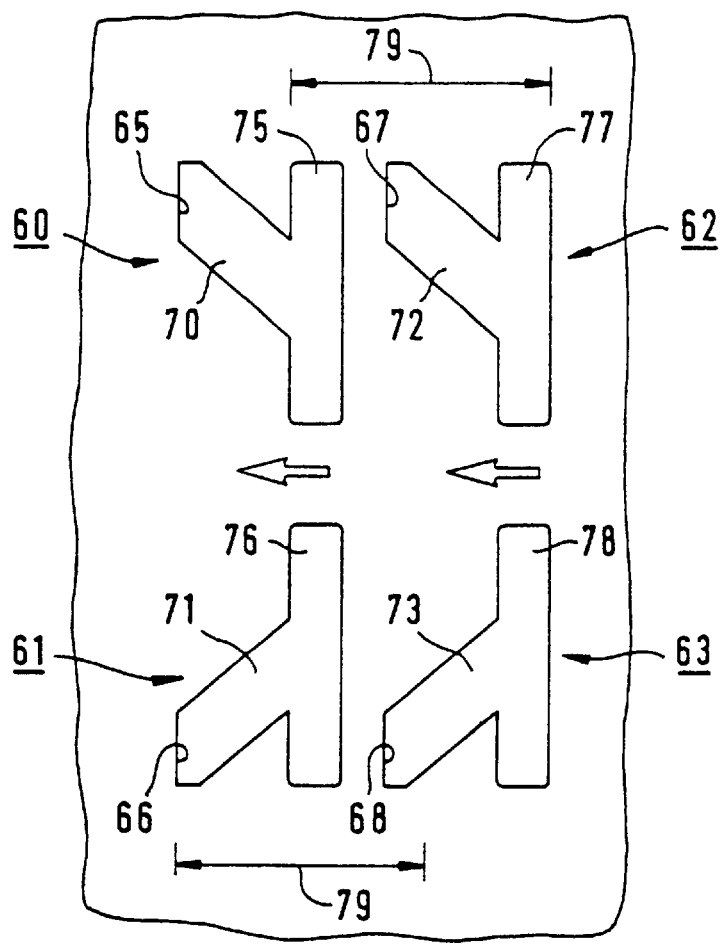
FIG. 6 is a fragmentary, plan view showing four mutually independent parts of an assembly opening, in which the parts are provided to fasten the spring of FIG. 3 in the web.

These assembly openings 60, 61, 62, 63 are represented more precisely in FIG. 6. In that figure, end edges of slot-shaped opening parts 70, 71, 72, 73 are designated by reference numerals 65, 66, 67, 68. The profiled sections 48, 49, 50, 51 touch these end edges in the operating position of the spring. In this case, the slot-shaped opening parts 70, 71, 72, 73 do not extend at right angles to the center line of the fuel rod but instead at a certain angle, so the spring must be compressed when it has to be displaced from the operating position into the assembly position. This is only possible while the spring is not loaded by a fuel rod (see FIG. 2) so that, in the loaded condition, the spring is locked in the operating position.

In this case as well, the slot-shaped opening parts 70, 71, 72, 73 end in enlarged cross-sectional areas 75, 76, 77, 78. Arrows 79 indicate the width of the springs (the distance between outer side edges of the profiled sections), which correspond to a corresponding width 79 in FIG. 4.

Figure 7:
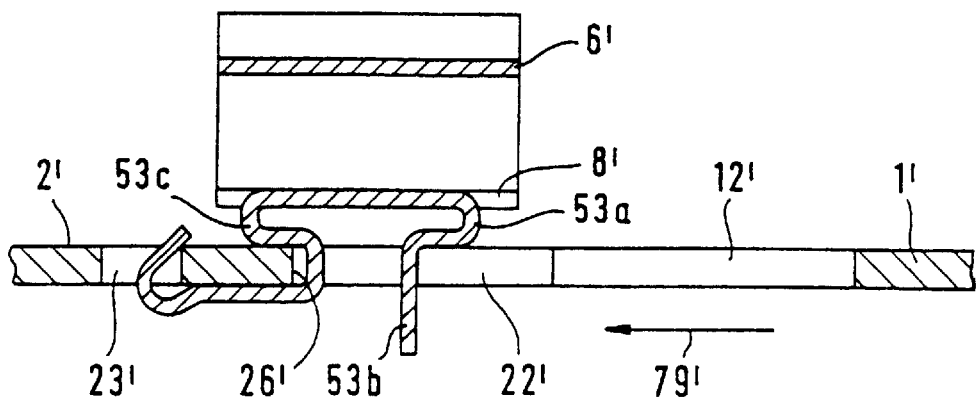
FIG. 7 is a fragmentary, cross-sectional view of a different spring according to the invention, in an operating position.

A cross section through a different spring, corresponding to FIG. 5, is shown in FIG. 7. This spring is inserted through an enlarged opening area 12' of an assembly opening provided in a web 1' through the use of profiled rims of its end strips 8'. The spring is then displaced in the direction of an arrow 79' along a slot-shaped part 22' of the assembly opening, sufficiently far for it to butt onto an end edge 26' of that slot-shaped part.

Since the profiled rims determine the size of the opening area 12', these rims are initially bent toward one another. In this way, upper profiled sections (or all four profiled sections under certain circumstances) can be inserted in the common opening area 12'. In addition, this provides an improvement of a contact surface, through the use of which inner profiled section parts 53a are supported on an inner surface 2' of the web.

Whereas an outer profiled section part 53b encompasses an edge of the web 1' at a rim of the slot 22' which is only above and below the plane of the drawing, another rim 53c carries a protuberance which, in this case, is configured in the shape of a barb. In this way, the spring is locked in a snap-in opening 23' of the web as soon as the operating position is taken up.

Figure 8:
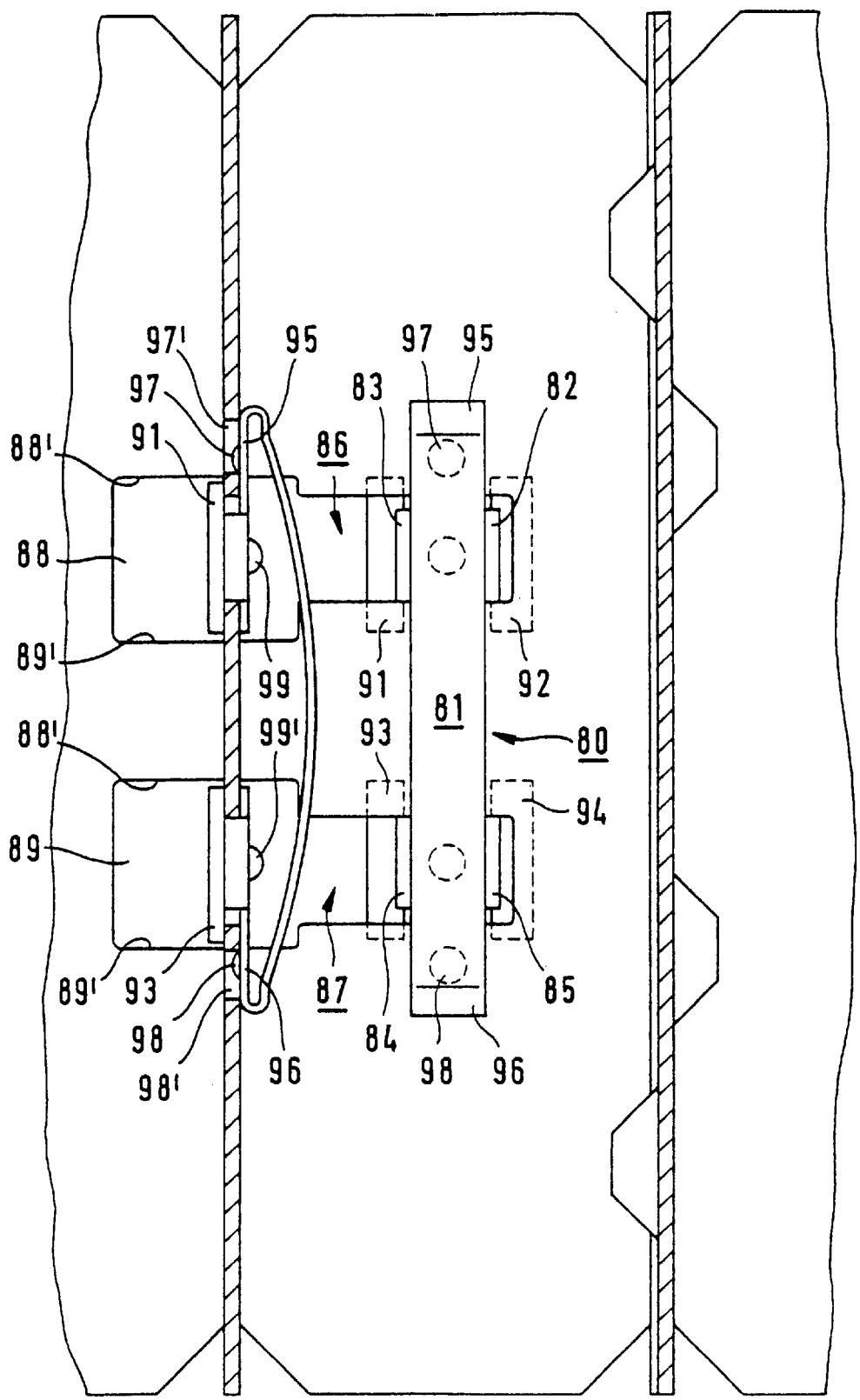
FIG. 8 is a fragmentary, longitudinal-sectional view of a mesh which carries two C-shaped springs according to the invention, somewhat modified relative to FIG. 1.

In an embodiment example shown in FIG. 8, a central part 81 of a spring 80 likewise merges into end strips which extend approximately parallel to the center line of the fuel rod and which have lateral rims 82, 83, 84, 85 that are bent away from the fuel rod and pass through corresponding assembly openings 86, 87. Outer profiled section parts 91, 92, 93, 94, which protrude on the back of a web are, in this case (in a manner similar to FIG. 5), again bent around and spread in order to encompass edges of the openings 86, 87 with a larger surface.

However, as a departure from FIGS. 1 to 7, only two slot-shaped opening parts are provided in this case. The upper slot-shaped opening part 86 is associated with the upper profiled section pair 91, 92 and the lower opening part 87 is associated with the lower profiled section pair 93, 94. Enlarged cross-sectional areas 88, 89 connected to the opening parts 86, 87 are located, in this embodiment example, at a position at which one longitudinal wall is crossed by a transverse wall. The spring is therefore inserted in the corresponding webs before the spacer is welded. Although this prevents a damaged spring, for example, from being subsequently changed, it reliably prevents a spring from becoming unintentionally loose if a rod is removed from the fuel assembly during inspection work.

In order to fix the spring in the operating position, each end strip 95, 96 carries a locking knob or protuberance 97, 98 which engages in a corresponding locking window 97', 98' in the web. The spring can therefore only be removed from the operating position if the corresponding end strips are bent sufficiently far away from the web.

In addition, the end strips of FIG. 8 carry further knobs or protuberances 99, 99' which point in the direction toward the resilient central part and act as a stop that limits the deflection of the resilient central part during loading of the spring. This can prevent the spring from being overstrained and damaged when the corresponding fuel rod is inserted in the mesh.

Generally speaking, it suffices if the outer profiled section parts, on the rims of the end strips, which are bent away from the fuel rod and protrude through the assembly openings, are only profiled in one direction, i.e. are configured as support webs which pass through the web in the assembly opening approximately at right angles and extend approximately parallel to the center line of the fuel rod. A bottom of such a first spring 100 is shown on the left in FIG. 9. A central part 101 is substantially covered by end strips 102 and 103 with snap-in knobs or protuberances 104, 105. Four profiled sections 106, 107, 108, 109, which form lateral rims of the end strips 102 and 103 as flat support webs, can be seen.

A top of a second spring 110 with a central part 111 and end strips 112, 113 that are covered (and therefore only indicated by interrupted lines) are shown on the right.

In this position of the two springs 100 and 110, the two springs are symmetrically placed relative to one another to the extent that the bottom of the first spring 100 points to the bottom of the second spring 110.

Figure 9:
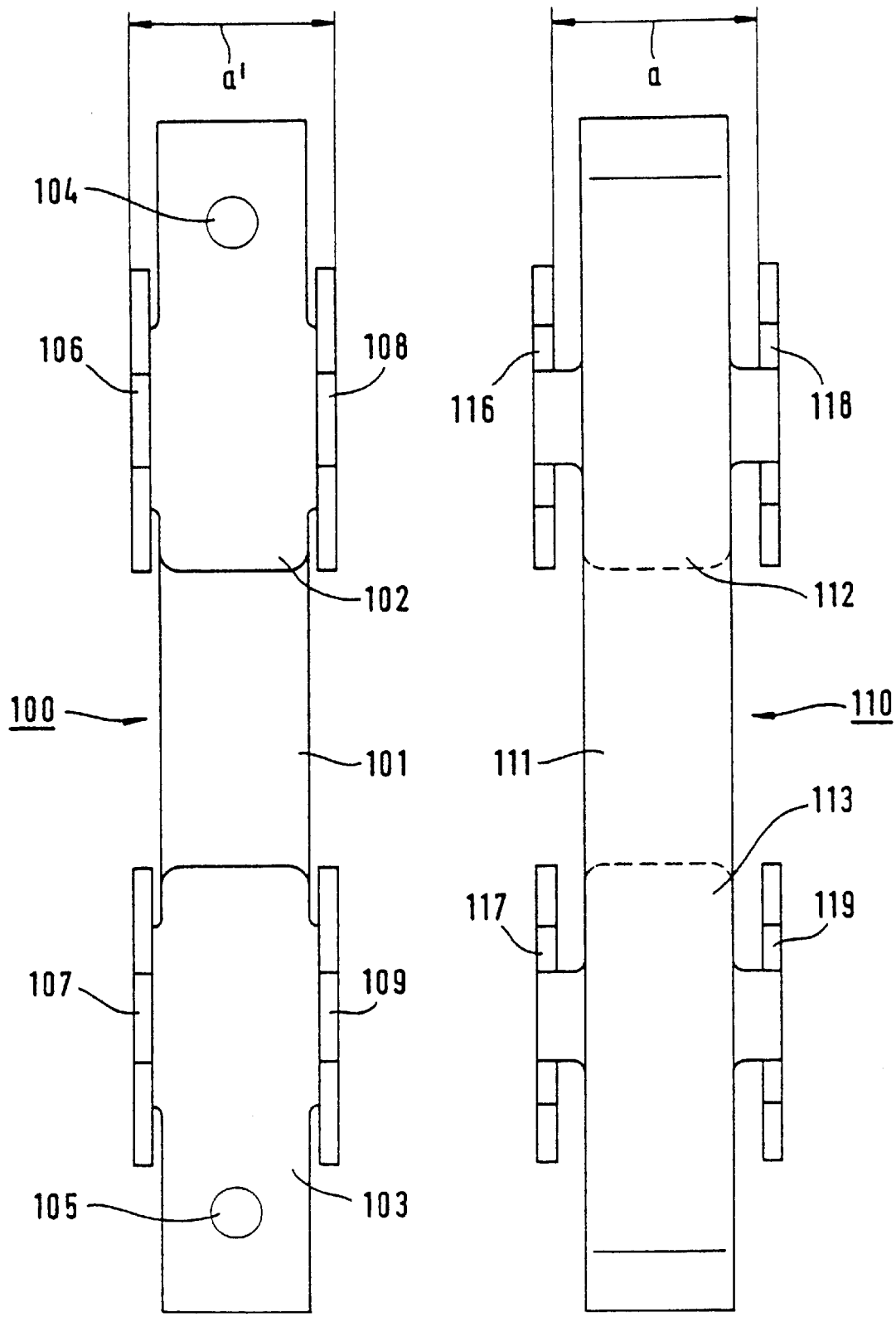
FIG. 9 is a fragmentary, end-elevational view of two springs, such as are provided for a second variant of the invention.
Figure 10:
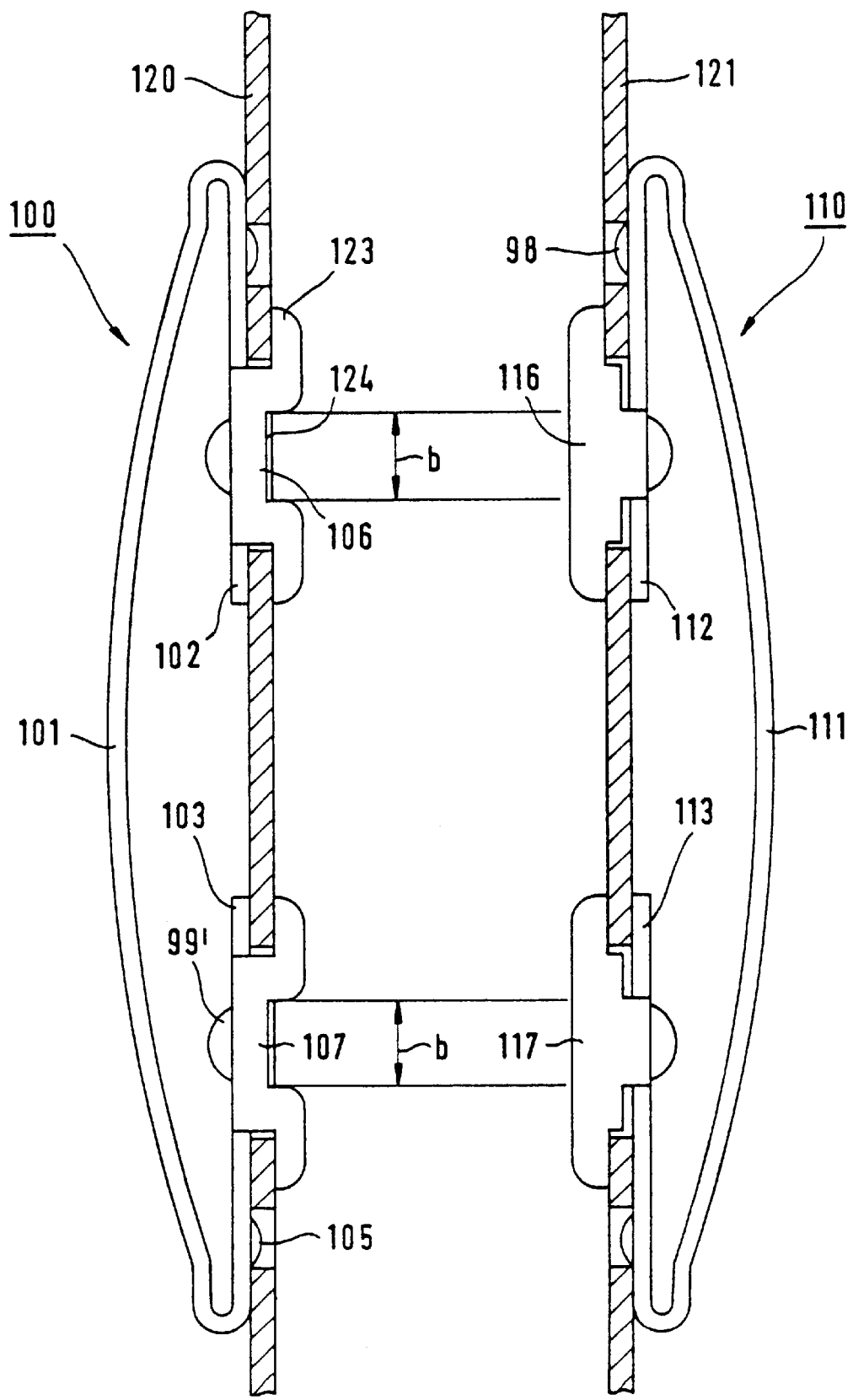
FIG. 10 is a fragmentary, longitudinal-sectional view of the two springs when they are initially fastened to different webs of the grid, corresponding to FIG. 1.

FIG. 10 shows two parallel webs 120, 121 of the spacer. The spring 100 is inserted from the left into the web 120 and the spring 110 is inserted from the right into the web 121. Profiled sections 106, 116 and 107, 117 on the rims of the two springs 100, 110 differ somewhat in this case. One outer profiled section part 123 of the profiled section 106, which is initially pushed through a non-illustrated assembly opening and protrudes through a slot of the web 120, has a recess 124 with a width b, which is not necessary for the profiled section 116. The width b corresponds approximately to the width of the profiled section 116 at a position where this profiled section 116 merges into an end strip 112. In addition, the spring 110 also differs from the spring 100, as is shown in FIG. 9, by the fact that inner surfaces of web-type rims 116, 118 of the spring 110 are at a distance from each other which is equal to or slightly larger than a distance a' between outer surfaces of web-type rims 106, 108 of the spring 100.

Figure 11:
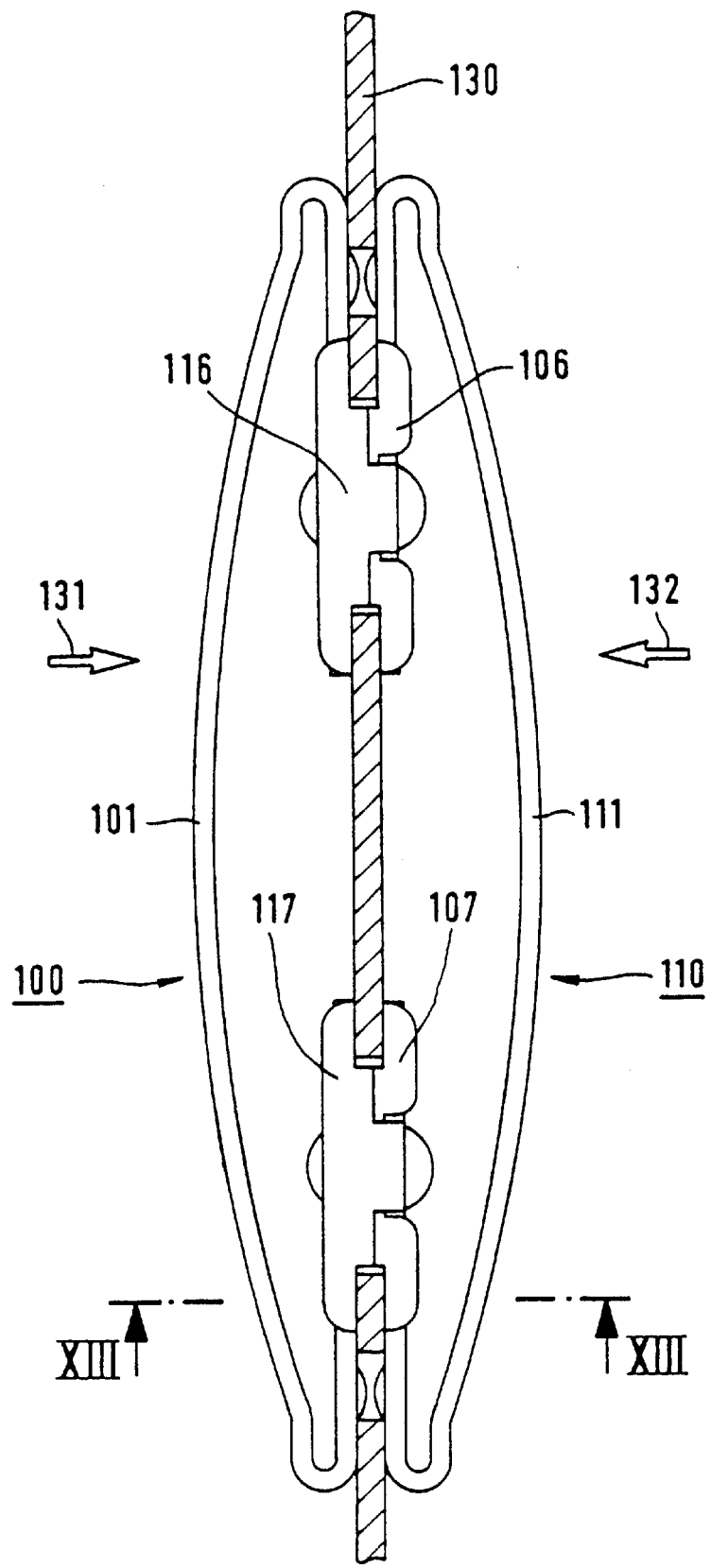
FIG. 11 is a fragmentary, longitudinal-sectional view of the two springs of FIGS. 9 and 10 when they are fastened to a common web, in accordance with the second variant of the invention.

The following is achieved, as is shown in FIG. 9, by this profiling: The two springs are already shown in such a way that their central parts point to opposite sides. If the spring 100 is, for example, displaced to the right, this makes it possible for the rims of the spring 100 to be inserted from the left into the corresponding rims of the spring 110, which are rims that point to the left. The two springs can therefore be simultaneously fastened to a common wall in such a way that their end strips are opposite to one another, as is shown in FIG. 11 through the use of a wall 130. The spring 100 is therefore inserted from the left, corresponding to an arrow 131, and the spring 110 is inserted from the right, corresponding an arrow 132, into a widened opening in the wall 130. The springs are displaced in the opening until, at the upper end strips 102 and 112, the profiled sections 106 and 116 of both springs, or the profiled sections 108 and 118, respectively, form a mutually engaging profiled section pair. At the lower end strips 103, 113, a profiled section pair is correspondingly formed from the profiled sections 107 and 117 and a second pair of mutually engaging profiled sections is formed from the profiled sections 109, 119.

Figure 12:
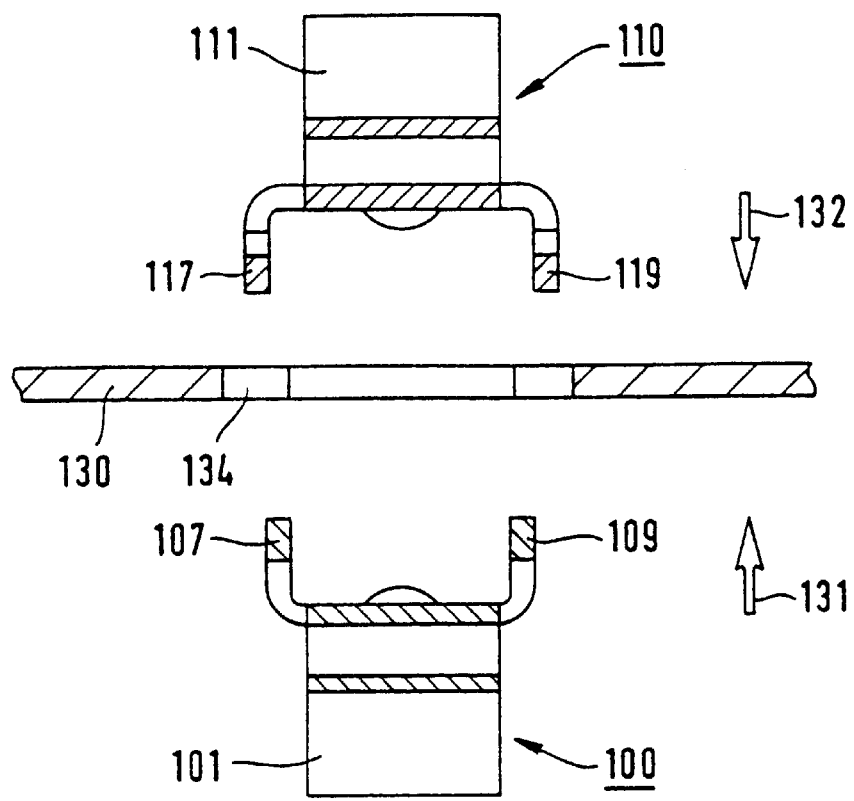
FIG. 12 is a fragmentary, cross-sectional view of the two springs of FIG. 9 before they are inserted in the assembly opening of the common web.

FIG. 12 shows the wall 130 with an enlarged cross-sectional area before the springs 100 and 110 are inserted in directions corresponding to the arrows 131 and 132 into corresponding assembly openings 134, through the use of their profiled section parts. The profiled sections of the two springs then finally engage in one another and the spring pair can then be displaced laterally along the edge of a slot-shaped opening part into the operating position.

Figure 13:
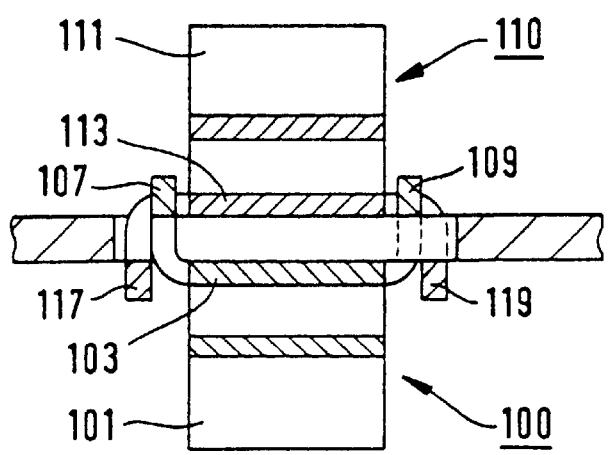
FIG. 13 is a fragmentary, cross-sectional view of the two springs of FIG. 12 when they are inserted in the opening and displaced along the common web into the operating position.

FIG. 13 shows a corresponding cross section of the fully assembled spring pair. The cross-sectional plane selected for FIG. 13 is indicated by numerals XIII—XIII in FIG. 11.

Figure 14:
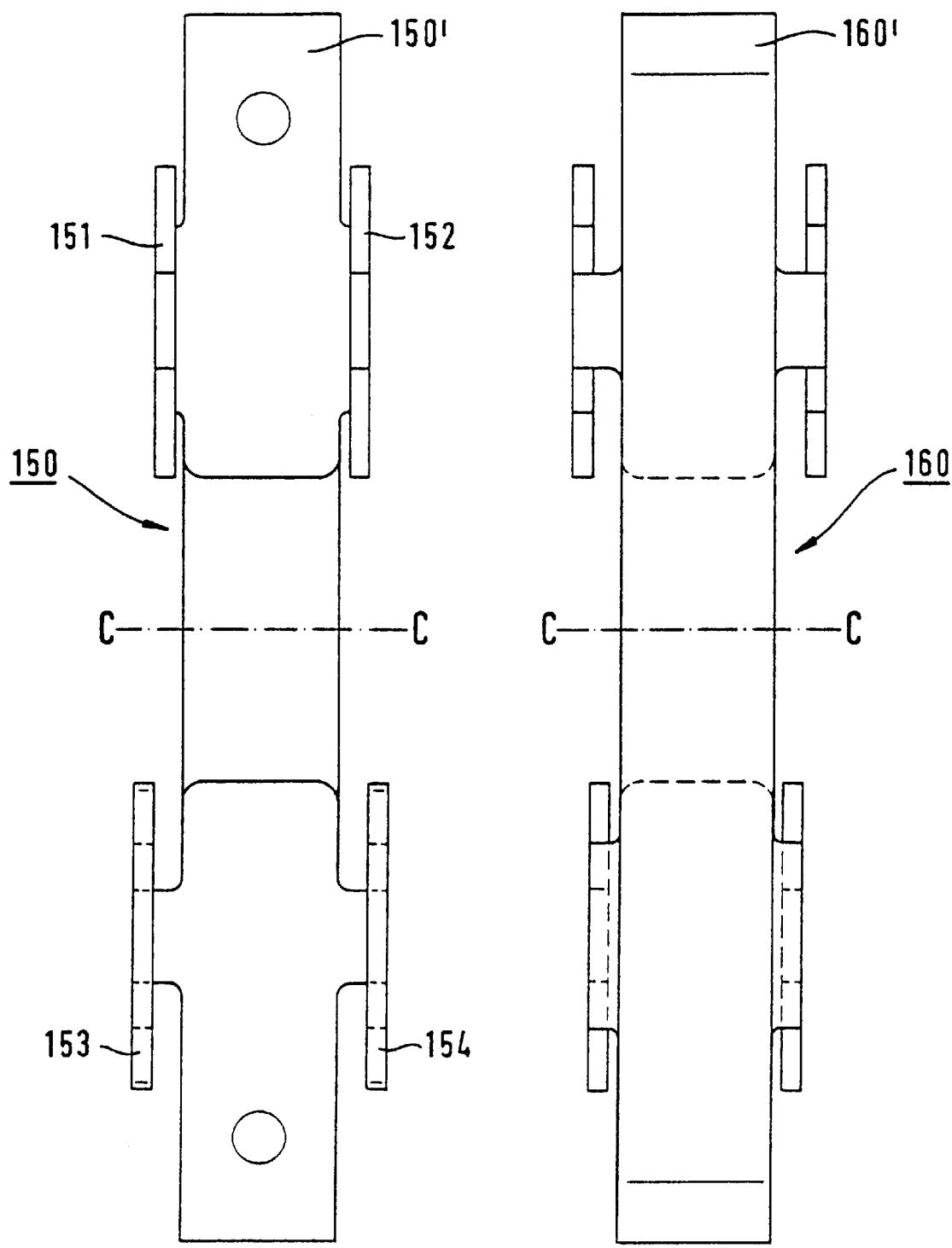
FIG. 14 is a plan view of a variant of FIG. 8 for which a single spring type is necessary.

FIG. 14 shows the bottom of a spring 150 which represents a combination of the two-springs 100 and 110 from FIG. 9 to the extent that lateral rims 151, 152 of an upper end strip 150' are formed corresponding to the rims 106, 108 of the end strip 102 of the spring 100. Corresponding lower rims 153, 154 are formed corresponding to the lower rims 117, 119 of the spring 110. If the spring 150 is pivoted about its transverse center line CC, the left-hand spring 150 of FIG. 14 becomes a right-hand spring 160. These two springs 150, 160 can now be combined to form a spring pair in the same manner as has been presented in FIGS. 12 and 13. This embodiment, therefore, only necessitates a single spring type.

Figure 15:
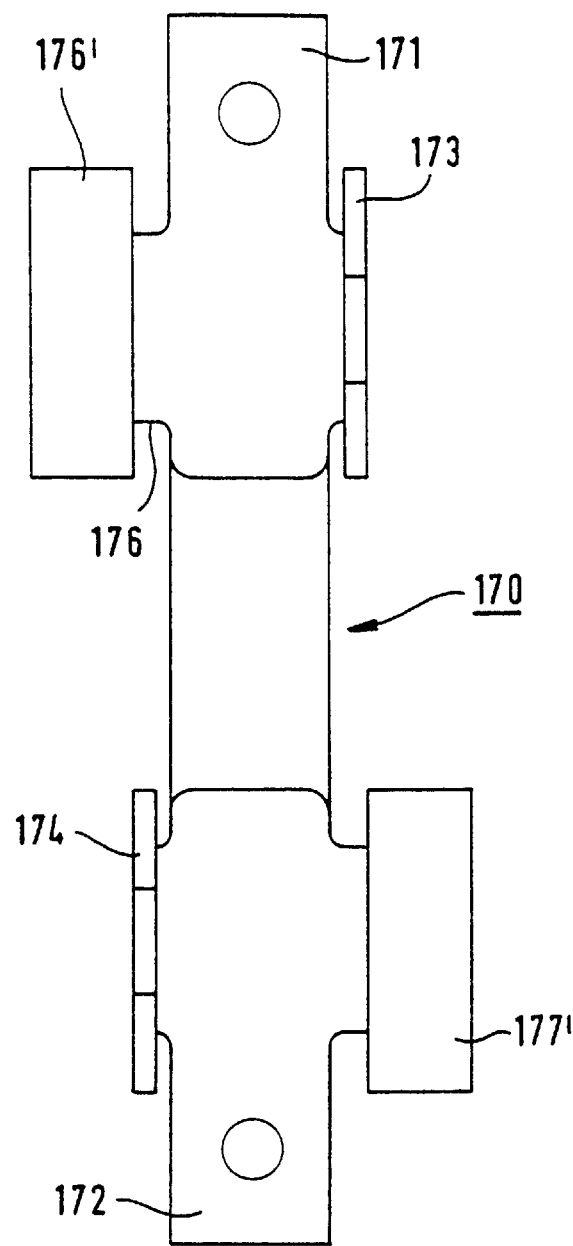
FIGS. 15 and 16 are respective plan and elevation views of a variant of the spring of FIG. 14.
Figure 16:
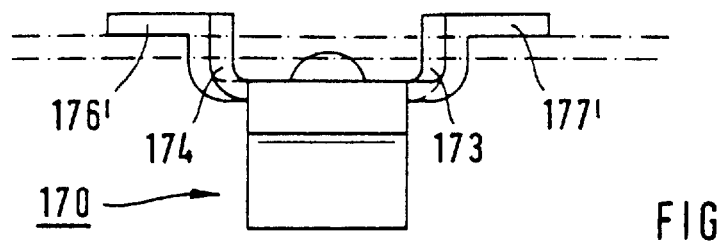

In a spring 170 of FIGS. 15 and 16, a right-hand upper rim 173 of an upper end strip 171 and a left-hand lower rim 174 of a lower end strip 172 are formed corresponding to the web-type rims of the spring 100. However, a left-hand upper rim 176 and a right-hand lower rim differ from the rim of the spring 100 to the extent that outer profiled section parts 176', 177' protruding beyond the web are bent outward over the rim of the slot-shaped opening part. The spring 170 therefore presents a combination of the spring 150 and the spring shown in FIG. 8.

Figure 17:
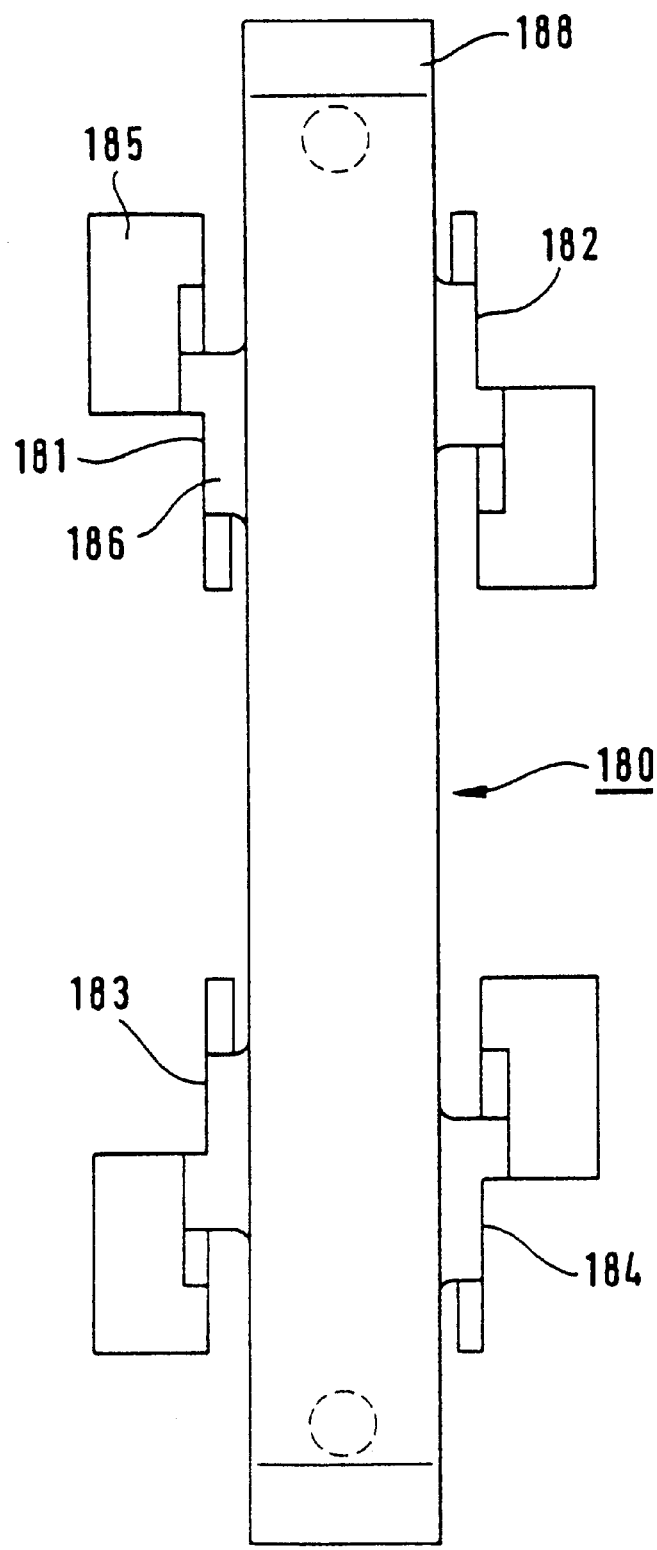
FIG. 17 is a plan view of a further variant of the spring.

In addition, the profiled sections 174, 176 of the spring 170 can also be combined to provide a single profiled section which can be used for all four rims 181, 182, 183, 184 of the spring, as is shown by a spring 180 of FIG. 17. In this embodiment, one profiled section part 185 corresponds to the profiled section part 176' and another profiled section part 186 corresponds to the profiled section part 174.

It may therefore be seen that the fastening according to the invention opens many variation possibilities.

Figure 18:
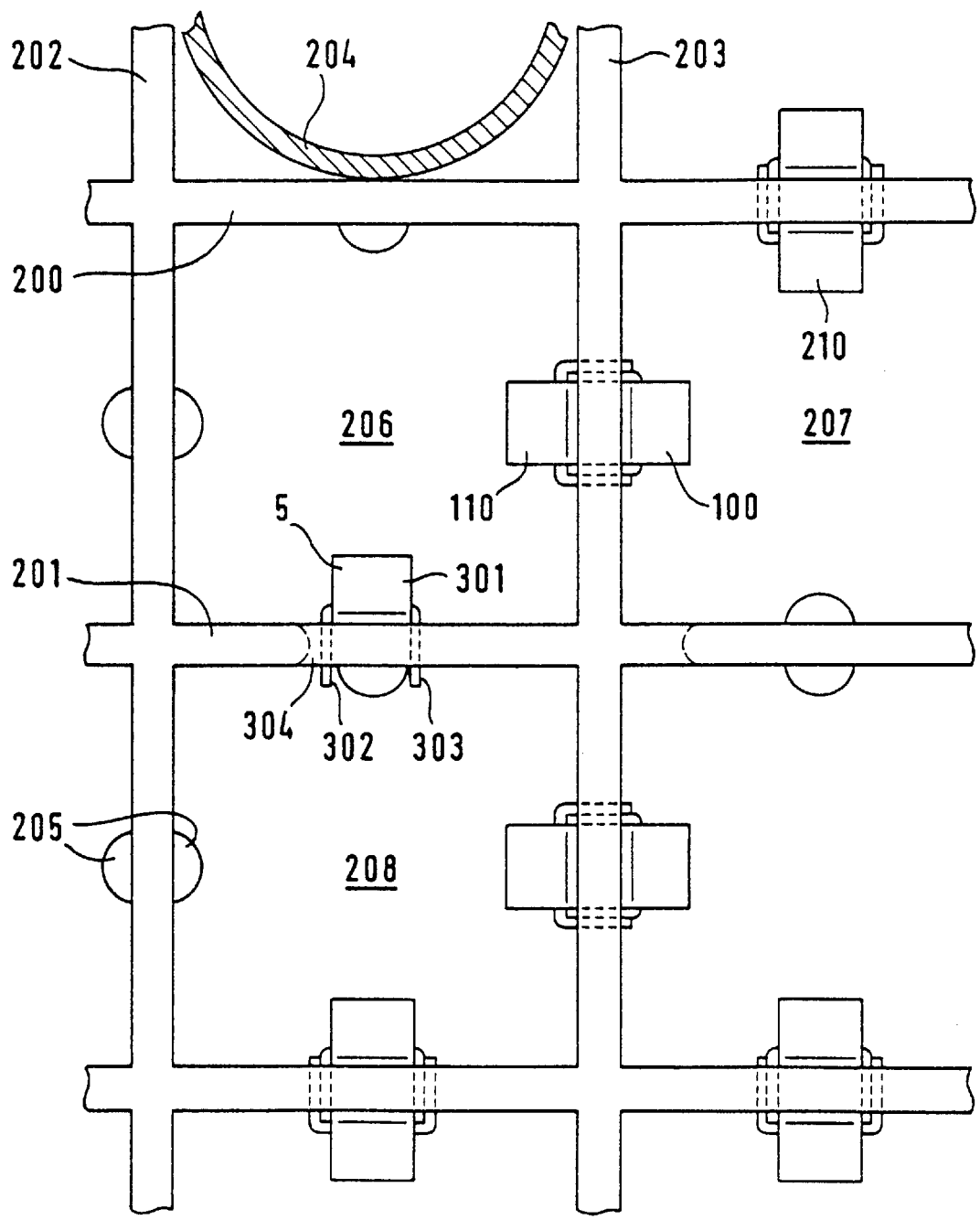
FIG. 18 is a fragmentary, plan view of a portion of an advantageous spacer according to the invention.

In a spacer, such as is shown as a portion of a pressurized water reactor, for example, in FIG. 18, webs 200, 201, 202, 203, etc. generally form square meshes in which two adjacent mesh sides each carry a spring in the center protruding into the mesh. The spring presses the fuel rod of this mesh (the fuel rods are omitted for the sake of clarity) against opposite knobs or protuberances 205. Two individual knobs or protuberances are usually located opposite a spring. The knobs or protuberances are disposed one above the other and respectively above and below the plane in which the spring presses against the fuel rod.

In general, each two adjacent meshes (for example meshes 206, 207) form a pair. The springs (for example the springs 110 and 100) which protrude into the meshes of a pair from a common wall separating the meshes of the pair, can be fastened as shown in FIGS. 10 to 17.

Since pressurized water fuel assemblies also have some meshes which contain a guide tube 204 on which the spacer is fastened, instead of a fuel rod, there can be deviations in the configuration in pairs of the meshes, so that unpaired springs (for example the spring 5) can also be necessary. Similar relationships can also be caused by water pipes, such as are used in many boiling water fuel assemblies, replacing some fuel rods.

Figure 19:
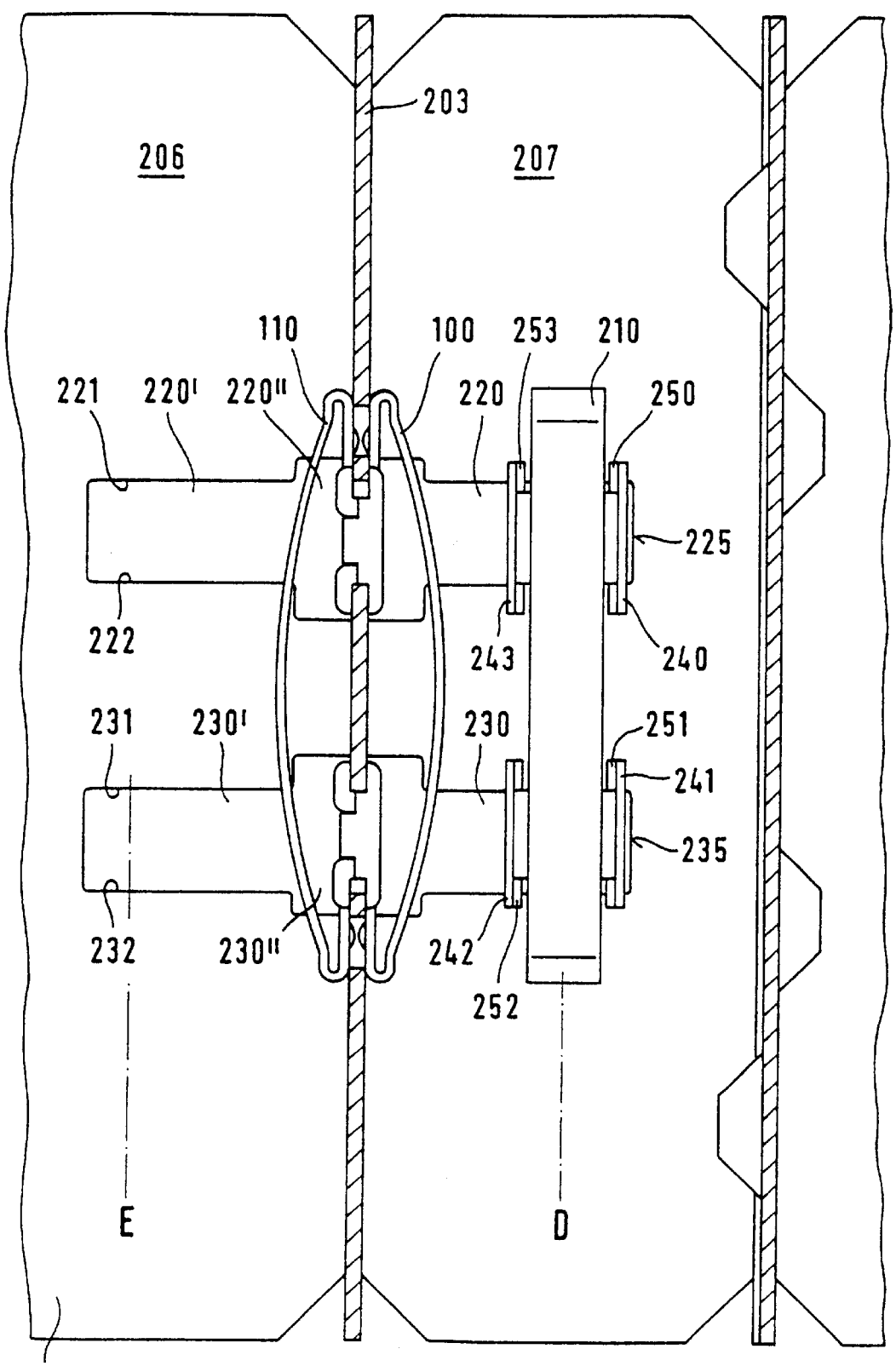
FIG. 19 is a fragmentary, cross-sectional view of a part of the spacer of FIG. 18.

FIG. 19 shows a longitudinal section through a part of the meshes 206 and 207 with springs 210, 110 and 100 supported on the webs 200 and 203. An assembly opening can be recognized in a wall 200. The assembly opening is necessary for inserting the spring 210 or a spring pair of which, apart from the first spring 210, only an outer profiled section part is visible, which is respectively formed on side rims of end strips of a second spring.

The assembly opening, which in this case is formed of two slot-shaped opening parts 220 and 230, has a widened opening area 221 which is laterally offset relative to the position in which the spring 210 (or the spring pair mentioned above) is located. This widened opening area is advantageously applied at the position of the web at which this web crosses another web 203 in the finally assembled fuel assembly. Therefore, this widened opening area is blocked when the webs are joined together to form a grid-shaped spacer after the insertion of the springs.

In accordance with FIGS. 12 and 13, the spring 210 is inserted through the use of the profiled section parts of its end strips from the front of the web shown in FIG. 19. Only inner profiled section parts 250, 251, 252, 253 of the spring 210 remain in the mesh while outer profiled section parts, which are not visible in FIG. 19, protrude into the adjacent mesh. Outer profiled section parts 240, 241, 242, 243 of the other spring are correspondingly pushed from the adjacent mesh (i.e. the back of the wall 200) through an opening area 220" and the two springs are joined together in such a way that one profiled section pair 240, 250 or 241, 251 or 242, 252 or 243, 253 results in each case.

If the widened opening area is to be used to insert corresponding springs in both a position D and in a position E, slot-shaped opening parts (220, 220', 230, 230') symmetrically emerge from this opening area toward both sides. These slot-shaped opening parts have edges 221, 222 and 231, 232 at the top and at the bottom, which act as a guide for the profiled section pairs when these profiled section pairs are displaced laterally from the assembly position into the operating position D. In this operating position, two profiled section pairs, namely the profiled section pair 240, 250 and the profiled section pair 241, 251 then touch the end edges 225, 235, located one above the other, of the slot-shaped opening parts 220, 230.

Apart from the extremely small material requirement for the fastening of the spring and the great freedom of choice for the shape of the spring itself, the invention has the great advantage of permitting two springs protruding into adjacent meshes to be seated in the same assembly opening in the center of a mesh wall. The principle which is used can be briefly stated by using the spring 5 of FIG. 18 as an example:

The spring, of which only an upper end 301 is visible in FIG. 18, has one rim 302, 303 for each of the sides at this upper end. That rim is bent out of the mesh 206 around the center line of the fuel assembly in such a way that it penetrates through an assembly opening 304 into the web 201. These two rims (302, 303) each carry a profiled section which approximately form-lockingly encompasses one edge of the assembly opening 304. The lower end of the spring also has one rim that is correspondingly bent outward on both sides with a profiled section form-lockingly encompassing an edge of the assembly opening.

As is shown in the figures, generally each spring (FIGS. 1 through 8) or each pair of springs (FIGS. 11 through 19) is associated with one assembly opening area and at least one snap-in opening in a web. The snap-in opening (e.g. 97' or 98' in FIG. 8 and the opening for the snap-in knob or protuberence 98 or 105 in FIG. 10) may be separated from the assembly opening area, but it may as well be integrated into that assembly opening area, especially in the enlarged parts of that area. That is shown in FIG. 1, where the convex curvature 7 snaps in the enlarged part 30 of the assembly opening area, or in FIG. 6, where a concave protrusion 40' (FIG. 3) of spring 40 snaps in the enlarged part 75. Each assembly opening area is formed of several parts which may be joined into one window or separated from each other. In FIG. 1, for instance, the assembly opening area is formed of four enlarged opening parts 30, 31, 32, 33 and four slot-shaped opening parts 22, 23, 24, 25, each slot-shaped opening part ending in an enlarged opening part. On the other hand, FIG. 8 shows only two slot-shaped opening parts 86, 87 and only two enlarged opening parts (enlarged cross-sectional areas 88, 89) forming one assembly opening area.

I claim:

1. A spacer of a fuel assembly for a light-water cooled nuclear reactor, the spacer comprising:

webs crossing each other to form meshes for inserting fuel rods having center line directions, said webs having snap-in openings formed therein, said webs having assembly opening areas formed therein with substantially slot-shaped opening parts having ends with edges, said assembly opening areas having enlarged opening parts each leading from a respective one of said substantially slot-shaped opening parts in parts of said webs, and said webs having inner surfaces facing toward the fuel rods;

a plurality of springs each held in one of said assembly opening areas in one of said webs, said springs having an operating position and an assembly position offset laterally relative to said operating position, and said springs having a spring force;

each of said springs having a resilient central part facing toward a fuel rod, said central part having a top and a bottom relative to the center line direction, and said central part having end strips each extending substantially parallel to a respective one of said webs and adjoining a respective one of said top and bottom, said end strips carrying a protuberance protruding and facing the fuel rod in order to limit deflection of each of said springs;

each of said end strips having two lateral rims each extending parallel to the center line direction and bent away from a fuel rod about the center line direction;

profiled sections each seated on a respective one of said rims of said end strips, said profiled sections having inner parts respectively supported on said inner surface of a respective one of said webs in said operating position of said spring, and said profiled sections having outer parts encompassing said edges at said ends of said opening parts through said substantially slot-shaped opening parts;

said outer parts of said profiled sections to be inserted in said enlarged opening parts of said assembly opening areas of said webs corresponding to said assembly position of said spring and displaced from said assembly position along said slot-shaped opening parts into said operating position; and said springs having at least one part pressed by said spring force into said snap-in opening in said operating position of said springs with the fuel rod inserted.

2. A spacer of a fuel assembly for a light-water cooled nuclear reactor, the spacer comprising:

webs crossing each other to form meshes for inserting fuel rods having center line directions, said webs having snap-in openings formed therein, said webs having assembly opening areas formed therein with substantially slot-shaped opening parts having ends with edges, said assembly opening areas having enlarged opening parts each leading from a respective one of said substantially slot-shaped opening parts in parts of said webs, and said webs having inner surfaces facing toward the fuel rods;

a plurality of springs each held in one of said assembly opening areas in one of said webs, said springs having an operating position and an assembly position offset laterally relative to said operating position, and said springs having a spring force;

each of said springs having a resilient central part facing toward a fuel rod, said central part having a top and a bottom relative to the center line direction, and said central part having end strips each extending substantially parallel to a respective one of said webs and adjoining a respective one of said top and bottom, said end strips carrying a protuberance protruding and pointing toward said resilient central part and limiting deflection of each of said springs;

each of said end strips having two lateral rims each extending parallel to the center line direction and bent away from a fuel rod about the center line direction;

profiled sections each seated on a respective one of said rims of said end strips, said profiled sections having inner parts respectively supported on said inner surface of a respective one of said webs in said operating position of said spring, and said profiled sections having outer parts encompassing said edges at said ends of said opening parts through said substantially slot-shaped opening parts;

said outer parts of said profiled sections to be inserted in said enlarged opening parts of said assembly opening areas of said webs corresponding to said assembly position of said spring and displaced from said assembly position along said slot-shaped opening parts into said operating position; and at least a part of each spring carrying a protuberance pointing away from a fuel rod and engaging in said snap-in opening in said operating position of said springs with the fuel rod inserted.

3. The spacer according to claim 1, wherein each assembly opening area has at least one pair of said enlarged opening parts formed therein, separated from one another and located one above the other, and said slot-shaped opening parts of said assembly opening areas respectively open into said enlarged opening parts.

4. The spacer according to claim 2, wherein each assembly opening area has at least a pair of said enlarged opening parts, separated from one another and located one above the other, and said slot-shaped opening parts of said assembly opening areas respectively open into said enlarged opening parts.

5. The spacer according to claim 1, wherein each of said slot-shaped parts is associated with a respective one of said rims of one of said end strips.

6. The spacer according to claim 2, wherein each of said slot-shaped parts is associated with a respective one of said rims of one of said end strips.

7. The spacer according to claim 4, wherein each of said slot-shaped parts ends in one of said enlarged opening parts, said end strips have a given width, said slot-shaped opening parts have a length substantially corresponding to half of said given width, and said enlarged opening parts also form said snap-in openings in which said protuberance facing away from the fuel rod engages.

8. The spacer according to claim 1, wherein:

said substantially slot-shaped opening parts of said assembly opening areas are four mutually separated slot-shaped parts each associated with a different respective one of said rims of said end strips;

said end strips have a given width and each of said slot-shaped parts has a length substantially corresponding to half of said given width;

each of said slot-shaped opening parts ends in a respective one of said four mutually separated enlarged opening parts;

said enlarged opening parts are disposed one above the other in respective pairs; and one of said pairs of said enlarged opening parts is enlarged in longitudinal direction of a fuel rod to such an extent that said one pair forms opening cross sections of said snap-in openings for accommodating said outer ends of said springs when the fuel rods press said springs in the direction of said webs.

9. The spacer according to claim 1, wherein said end strips extend approximately parallel to said webs having said assembly openings.

10. The spacer according to claim 2, wherein said end strips extend approximately parallel to said webs having said assembly openings.

11. A spacer of a fuel assembly for a light-water cooled nuclear reactor, the spacer comprising:

webs crossing each other to form first and second meshes for inserting fuel rods having center lines, said webs including common webs between two of said meshes, said common webs having a first side surface facing toward a first one of the fuel rods and a second side surface facing toward a second one of the fuel rods, said common webs having assembly opening areas formed therein defining rims of said assembly openings and web edges at said rims, said assembly opening areas having an enlarged opening part at a given position on one of said webs, at least one substantially slot-shaped opening part having opening edges extending transverse to the fuel rods and end edges disposed one above the other, and said webs having snap-in openings; and first and second springs held in said assembly opening areas and having central parts, assembly positions, operating positions and spring forces;

a) said first spring including:
i) a first resilient central part protruding into one of said first meshes, said first resilient central part laterally supporting a first fuel rod to be inserted in said first mesh, and said first resilient central part having a top and a bottom relative to the center line of a fuel rod and two first end strips each adjoining a respective one of said top and bottom;
ii) four rims including left and right lateral rims disposed on each of said two first end strips, said four rims extending approximately parallel to the center line of the fuel rod and bent away from the first fuel rod;
iii) first profiled sections each disposed on a respective one of said four rims, each of said first profiled sections having an inner profiled section part supported on said first side surface of said common web in said operating position of said first spring, and an outer profiled section part encompassing said web edges through said assembly opening area;

b) said second spring including:
i) a second resilient central part protruding into one of said second meshes, said second resilient central part laterally supporting a second fuel rod to be inserted in said second mesh, and said second resilient central part having a top and a bottom relative to the center line of a fuel rod and two second end strips each adjoining a respective one of said top and bottom;
ii) four rims including left and right lateral rims on each of said two second end strips, said four rims extending approximately parallel to the center line of the fuel rod and bent away from the second fuel rod; and
iii) second profiled sections each disposed on a respective one of said four rims, each of said second profiled sections having an inner profiled section part supported on said second side surface of said common web in said operating position of said second spring, and an outer profiled section part encompassing said web edges through said assembly opening area;

c) said end strips carrying a protuberance and pointing toward said resilient central part, limiting deflection of said first and said second springs, and including mutually opposite upper end strips and mutually opposite lower end strips, and one of said first and an adjacent one of said second profiled sections shaped to form four profiled section pairs, in said operating position of both of said springs;
i) said outer profiled section parts of said first profiled sections to be inserted from said first side surface and said outer profiled section parts of said second profiled sections to be inserted from said second side surface, in said enlarged opening part in said position on said one web laterally displaced relative to said operating position of said springs;
ii) said outer profiled section parts guided in said opening edges upon laterally displacement of said springs from said assembly position into said operating position; and
iii) a pair of said profiled section pairs located one above the other and positioned on said end edges upon jointly pushing said springs laterally into said operating position; and d) one of said springs having at least one part pressed by said spring force into said snap-in opening in said operating position of both of said springs.

12. A spacer of a fuel assembly for a light-water cooled nuclear reactor, the spacer comprising:

webs crossing each other to form first and second meshes for inserting fuel rods having center lines, said webs including common webs between two of said meshes, said common webs having a first side surface facing toward a first one of the fuel rods and a second side surface facing toward a second one of the fuel rods, said common webs having assembly openings formed therein defining rims of said assembly openings and web edges at said rims, said assembly opening areas having an enlarged opening part at a given position on one of said webs, at least one substantially slot-shaped opening part having opening edges extending transverse to the fuel rods and end edges disposed one above the other, and said webs having snap-in openings; and first and second springs held in said assembly openings and having central parts, assembly positions, operating positions and spring forces;

a) said first spring including:
   i) a first resilient central part protruding into one of said first meshes, said first resilient central part laterally supporting a first fuel rod to be inserted in said first mesh, and said first resilient central part having a top and a bottom relative to the center line of a fuel rod and two first end strips each adjoining a respective one of said top and bottom;
   ii) four rims including left and right lateral rims disposed on each of said two first end strips, said four rims extending approximately parallel to the center line of the fuel rod and bent away from the first fuel rod;
   iii) first profiled sections each disposed on a respective one of said four rims, each of said first profiled sections having an inner profiled section part supported on said first side surface of said common web in said operating position of said first spring, and an outer profiled section part encompassing said web edges through said assembly opening area;

b) said second spring including:
   i) a second resilient central part protruding into one of said second meshes, said second resilient central part laterally supporting a second fuel rod to be inserted in said second mesh, and said second resilient central part having a top and a bottom relative to the center line of a fuel rod and two second end strips each adjoining a respective one of said top and bottom;
   ii) four rims including left and right lateral rims on each of said two second end strips, said four rims extending approximately parallel to the center line of the fuel rod and bent away from the second fuel rod; and
   iii) second profiled sections each disposed on a respective one of said four rims, each of said second profiled sections having an inner profiled section part supported on said second side surface of said common web in said operating position of said second spring, and an outer profiled section part encompassing said web edges through said assembly opening area;

c) said end strips carrying a protuberance and pointing toward said resilient central part, limiting deflection of said first and said second springs, and including mutually opposite upper end strips and mutually opposite lower end strips, and one of said first and an adjacent one of said second profiled sections shaped to form four profiled section pairs, in said operating position of both of said springs;
   i) said outer profiled section parts of said first profiled sections to be inserted from said first side surface and said outer profiled section parts of said second profiled sections to be inserted from said second side surface, in said enlarged opening part in said position on said one web laterally displaced relative to said operating position of said springs;
   ii) said outer profiled section parts guided in said opening edges upon laterally displacement of said springs from said assembly position into said operating position; and
   iii) a pair of said profiled section pairs located one above the other and positioned on said end edges upon jointly pushing said springs laterally into said operating position; and d) at least a part carrying a protuberance pointing away from a fuel rod and engaging in said snap-in opening in said operating position of both of said springs.

13. The spacer according to claim 11, wherein said at least one substantially slot-shaped opening part includes an upper opening part associated with said profiled sections on said upper end strips and a lower opening part associated with said profiled sections on said lower end strips.

14. The spacer according to claim 12, wherein said at least one substantially slot-shaped opening part includes an upper opening part associated with said profiled sections on said upper end strips and a lower opening part associated with said profiled sections on said lower end strips.

15. The spacer according to claim 13, wherein said assembly opening area has two enlarged parts disposed one above the other, and each of said slot-shaped opening parts is associated with a respective one of said enlarged parts of said assembly opening area.

16. The spacer according to claim 14, wherein said assembly opening area has two enlarged parts disposed one above the other, and each of said slot-shaped opening parts is associated with a respective one of said enlarged parts of said assembly opening area.

17. The spacer according to claim 1, wherein said central part of said spring is domed and has ends each merging with a convex curvature into a respective one of said end strips substantially parallel to one of said webs.

18. The spacer according to claim 2, wherein said central part of said spring is domed and has ends each merging with a convex curvature into a respective one of said end strips substantially parallel to one of said webs.

19. The spacer according to claim 11, wherein said central parts of said springs are domed and have ends each merging with a convex curvature into a respective one of said end strips substantially parallel to one of said webs.

20. The spacer according to claim 12, wherein said central parts of said springs are domed and have ends each merging with a convex curvature into a respective one of said end strips substantially parallel to one of said webs.

21. The spacer according to claim 18, wherein said convex curvature forms said protuberance pointing away from the fuel rod and engaging in said snap-in opening in said web, when the fuel rod is inserted.

22. The spacer according to claim 20, wherein said convex curvature forms said protuberance pointing away from the fuel rod and engaging in said snap-in opening in said web, when the fuel rod is inserted.

23. The spacer according to claim 1, including at least one rigid stop element disposed opposite said resilient central part.

24. The spacer according to claim 2, including at least one rigid stop element disposed opposite said resilient central part.

25. The spacer according to claim 11, including at least one rigid stop element disposed opposite said resilient central part.

26. The spacer according to claim 12, including at least one rigid stop element disposed opposite said resilient central part.

27. A spacer of a fuel assembly for a light-water cooled nuclear reactor, the spacer comprising:

webs crossing each other to form meshes for inserting fuel rods having center line directions, said webs having snap-in openings formed therein, said webs having assembly opening areas formed therein with substantially slot-shaped opening parts having ends with edges, said assembly opening areas having enlarged opening parts each leading from a respective one of said substantially slot-shaped opening parts in parts of said webs, and said webs having inner surfaces facing toward the fuel rods;

a plurality of springs each held in one of said assembly opening areas in one of said webs, said springs having an operating position and an assembly position offset laterally relative to said operating position, and said springs having a spring force;

each of said springs having a resilient central part facing toward a fuel rod, said central part having a top and a bottom relative to the center line direction, and said central part having end strips each extending substantially parallel to a respective one of said webs and adjoining a respective one of said top and bottom;

two rigid knobs disposed opposite said resilient central part;

said end strips carrying a protuberance protruding and pointing toward said relient central part and limiting deflection of each of said springs, and each of said end strips having two lateral rims each extending parallel to the center line direction and bent away from a fuel rod about the center line direction;

profiled sections each seated on a respective one of said rims of said end strips, said profiled sections having inner parts respectively supported on said inner surface of a respective one of said webs in said operating position of said spring, and said profiled sections having outer parts encompassing said edges at said ends of said opening parts through said substantially slot-shaped opening parts;

said outer parts of said profiled sections to be inserted in said enlarged opening parts of said assembly opening areas of said webs corresponding to said assembly position of said spring and displaced from said assembly position along said slot-shaped opening parts into said operating position; and said springs having at least one part pressed by said spring force into said snap-in opening in said operating position of said springs with the fuel rod inserted.

28. A spacer of a fuel assembly for a light-water cooled nuclear reactor, the spacer comprising:

webs crossing each other to form meshes for inserting fuel rods having center line directions, said webs having snap-in openings formed therein, said webs having assembly opening areas formed therein with substantially slot-shaped opening parts having ends with edges, said assembly opening areas having enlarged opening parts each leading from a respective one of said substantially slot-shaped opening parts in parts of said webs, and said webs having inner surfaces facing toward the fuel rods;

a plurality of springs each held in one of said assembly opening areas in one of said webs, said springs having an operating position and an assembly position offset laterally relative to said operating position, and said springs having a spring force;

each of said springs having a resilient central part facing toward a fuel rod, said central part having a top and a bottom relative to the center line direction, and said central part having end strips each extending substantially parallel to a respective one of said webs and adjoining a respective one of said top and bottom;

two rigid knobs disposed opposite said resilient central part;

said end strips carrying a protuberance protruding and pointing toward said resilient central part and limiting deflection of each of said springs, and each of said end strips having two lateral rims each extending parallel to the center line direction and bent away from a fuel rod about the center line direction;

profiled sections each seated on a respective one of said rims of said end strips, said profiled sections having inner parts respectively supported on said inner surface of a respective one of said webs in said operating position of said spring, and said profiled sections having outer parts encompassing said edges at said ends of said opening parts through said substantially slot-shaped opening parts;

said outer parts of said profiled sections to be inserted in said enlarged opening parts of said assembly opening areas of said webs corresponding to said assembly position of said spring and displaced from said assembly position along said slot-shaped opening parts into said operating position; and at least a part of each spring carrying a protuberance pointing away from a fuel rod and engaging in said snap-in opening in said operating position of said springs with the fuel rod inserted.

29. A spacer of a fuel assembly for a light-water cooled nuclear reactor, the spacer comprising:

webs crossing each other to form first and second meshes for inserting fuel rods having center lines, said webs including common webs between two of said meshes, said common webs having a first side surface facing toward a first one of the fuel rods and a second side surface facing toward a second one of the fuel rods, said common webs having assembly opening areas formed therein defining rims of said assembly openings and web edges at said rims, said assembly opening areas having an enlarged opening part at a given position on one of said webs, at least one substantially slot-shaped opening part having opening edges extending transverse to the fuel rods and end edges disposed one above the other, and said webs having snap-in openings; and first and second springs held in said assembly opening areas and having central parts, assembly positions, operating positions and spring forces;

a) said first spring including:
i) a first resilient central part protruding into one of said first meshes, said first resilient central part laterally supporting a first fuel rod to be inserted in said first mesh, and said first resilient central part having a top and a bottom relative to the center line of a fuel rod and two first end strips each adjoining a respective one of said top and bottom;
ii) four rims including left and right lateral rims disposed on each of said two first end strips, said four rims extending approximately parallel to the center line of the fuel rod and bent away from the first fuel rod;

iii) first profiled sections each disposed on a respective one of said four rims, each of said first profiled sections having an inner profiled section part supported on said first side surface of said common web in said operating position of said first spring, and an outer profiled section part encompassing said web edges through said assembly opening area;

b) said second spring including:

i) a second resilient central part protruding into one of said second meshes, said second resilient central part laterally supporting a second fuel rod to be inserted in said second mesh, and said second resilient central part having a top and a bottom relative to the center line of a fuel rod and two second end strips each adjoining a respective one of said top and bottom;

ii) four rims including left and right lateral rims on each of said two second end strips, said four rims extending approximately parallel to the center line of the fuel rod and bent away from the second fuel rod; and iii) second profiled sections each disposed on a respective one of said four rims, each of said second profiled sections having an inner profiled section part supported on said second side surface of said common web in said operating position of said second spring, and an outer profiled section part encompassing said web edges through said assembly opening area;

c) said end strips carrying a protuberance and pointing toward said resilient central part, limiting deflection of said first and said second springs, and including mutually opposite upper end strips and mutually opposite lower end strips, and one of said first and an adjacent one of said second profiled sections shaped to form four profiled section pairs, in said operating position of both of said springs;

i) said outer profiled section parts of said first profiled sections to be inserted from said first side surface and said outer profiled section parts of said second profiled sections to be inserted from said second side surface, in said enlarged opening part in said position on said one web laterally displaced relative to said operating position of said springs;

ii) said outer profiled section parts guided in said opening edges upon laterally displacement of said springs from said assembly position into said operating position; and iii) a pair of said profiled section pairs located one above the other and positioned on said end edges upon jointly pushing said springs laterally into said operating position;

d) one of said springs having at least one part pressed by said spring force into said snap-in opening in said operating position of both of said springs; and two rigid knobs disposed opposite said resilient central part.

30. A spacer of a fuel assembly for a light-water cooled nuclear reactor, the spacer comprising:

webs crossing each other to form first and second meshes for inserting fuel rods having center lines, said webs including common webs between two of said meshes, said common webs having a first side surface facing toward a first one of the fuel rods and a second side surface facing toward a second one of the fuel rods, said common webs having assembly openings formed therein defining rims of said assembly openings and web edges at said rims, said assembly opening areas having an enlarged opening part at a given position on one of said webs, at least one substantially slot-shaped opening part having opening edges extending transverse to the fuel rods and end edges disposed one above the other, and said webs having snap-in openings; and first and second springs held in said assembly openings and having central parts, assembly positions, operating positions and spring forces;

a) said first spring including:

i) a first resilient central part protruding into one of said first meshes, said first resilient central part laterally supporting a first fuel rod to be inserted in said first mesh, and said first resilient central part having a top and a bottom relative to the center line of a fuel rod and two first end strips each adjoining a respective one of said top and bottom;

ii) four rims including left and right lateral rims disposed on each of said two first end strips, said four rims extending approximately parallel to the center line of the fuel rod and bent away from the first fuel rod;

iii) first profiled sections each disposed on a respective one of said four rims, each of said first profiled sections having an inner profiled section part supported on said first side surface of said common web in said operating position of said first spring, and an outer profiled section part encompassing said web edges through said assembly opening area;

b) said second spring including:

i) a second resilient central part protruding into one of said second meshes, said second resilient central part laterally supporting a second fuel rod to be inserted in said second mesh, and said second resilient central part having a top and a bottom relative to the center line of a fuel rod and two second end strips each adjoining a respective one of said top and bottom;

ii) four rims including left and right lateral rims on each of said two second end strips, said four rims extending approximately parallel to the center line of the fuel rod and bent away from the second fuel rod; and iii) second profiled sections each disposed on a respective one of said four rims, each of said second profiled sections having an inner profiled section part supported on said second side surface of said common web in said operating position of said second spring, and an outer profiled section part encompassing said web edges through said assembly opening area;

c) said end strips carrying a protuberance and pointing toward said resilient central part, limiting deflection of said first and said second springs, and including mutually opposite upper end strips and mutually opposite lower end strips, and one of said first and an adjacent one of said second profiled sections shaped to form four profiled section pairs, in said operating position of both of said springs;

i) said outer profiled section parts of said first profiled sections to be inserted from said first side surface and said outer profiled section parts of said second profiled sections to be inserted from said second side surface, in said enlarged opening part in said position on said one web laterally displaced relative to said operating position of said springs;

ii) said outer profiled section parts guided in said opening edges upon laterally displacement of said springs from said assembly position into said operating position; and iii) a pair of said profiled section pairs located one above the other and positioned on said end edges upon jointly pushing said springs laterally into said operating position;

d) at least a part carrying a protuberance pointing away from a fuel rod and engaging in said snap-in opening in said operating position of both of said springs; and two rigid knobs disposed opposite said resilient central part.

31. A spacer of a fuel assembly for a light-water cooled nuclear reactor, the spacer comprising:

webs crossing each other to form meshes for inserting fuel rods having center line directions, said webs having centers and snap-in openings formed therein, said webs having corners and assembly opening areas formed therein with substantially slot-shaped opening parts having ends with edges, said assembly opening areas having enlarged opening parts each leading from a respective one of said substantially slot-shaped opening parts in parts of said webs, and said webs having inner surfaces facing toward the fuel rods;

a plurality of springs each held in one of said assembly opening areas in one of said webs, said springs having an operating position, said operating position being established in said center of one of said webs between two of said corners of one of said meshes, and an assembly position offset laterally relative to said operating position, and said springs having a spring force;

each of said springs having a resilient central part facing toward a fuel rod, said central part having a top and a bottom relative to the center line direction, and said central part having end strips each extending substantially parallel to a respective one of said webs and adjoining a respective one of said top and bottom;

said end strips carrying a protuberance protruding and pointing toward said resilient central part and limiting deflection of each of said springs, and each of said end strips having two lateral rims each extending parallel to the center line direction and bent away from a fuel rod about the center line direction;

profiled sections each seated on a respective one of said rims of said end strips, said profiled sections having inner parts respectively supported on said inner surface of a respective one of said webs in said operating position of said spring, and said profiled sections having outer parts encompassing said edges at said ends of said opening parts through said substantially slot-shaped opening parts;

said outer parts of said profiled sections to be inserted in said enlarged opening parts of said assembly opening areas of said webs corresponding to said assembly position of said spring and displaced from said assembly position along said slot-shaped opening parts into said operating position; and said springs having at least one part pressed by said spring force into said snap-in opening in said operating position of said springs with the fuel rod inserted.

32. A spacer of a fuel assembly for a light-water cooled nuclear reactor, the spacer comprising:

webs crossing each other to form meshes for inserting fuel rods having corners and center line directions, said webs having centers snap-in openings formed therein, said webs having assembly opening areas formed therein with substantially slot-shaped opening parts having ends with edges, said assembly opening areas having enlarged opening parts each leading from a respective one of said substantially slot-shaped opening parts in parts of said webs, and said webs having inner surfaces facing toward the fuel rods;

a plurality of springs each held in one of said assembly opening areas in one of said webs, said springs having an operating position and an assembly position offset laterally relative to said operating position, and said springs having a spring force, said operating position being established in said center of one of said webs between two of said corners of one of said meshes;

each of said springs having a resilient central part facing toward a fuel rod, said central part having a top and a bottom relative to the center line direction, and said central part having end strips each extending substantially parallel to a respective one of said webs and adjoining a respective one of said top and bottom;

said end strips carrying a protuberance protruding and pointing toward said resilient central part and limiting deflection of each of said springs, and each of said end strips having two lateral rims each extending parallel to the center line direction and bent away from a fuel rod about the center line direction;

profiled sections each seated on a respective one of said rims of said end strips, said profiled sections having inner parts respectively supported on said inner surface of a respective one of said webs in said operating position of said spring, and said profiled sections having outer parts encompassing said edges at said ends of said opening parts through said substantially slot-shaped opening parts;

said outer parts of said profiled sections to be inserted in said enlarged opening parts of said assembly opening areas of said webs corresponding to said assembly position of said spring and displaced from said assembly position along said slot-shaped opening parts into said operating position; and at least a part of each spring carrying a protuberance pointing away from a fuel rod and engaging in said snap-in opening in said operating position of said springs with the fuel rod inserted.

33. A spacer of a fuel assembly for a light-water cooled nuclear reactor, the spacer comprising:

webs crossing each other to form first and second meshes for inserting fuel rods having center lines, said webs including centers and common webs between two of said meshes, said meshes having corners, said common webs having a first side surface facing toward a first one of the fuel rods and a second side surface facing toward a second one of the fuel rods, said common webs having assembly opening areas formed therein defining rims of said assembly openings and web edges at said rims, said assembly opening areas having an enlarged opening part at a given position on one of said webs, at least one substantially slot-shaped opening part having opening edges extending transverse to the fuel rods and end edges disposed one above the other, and said webs having snap-in openings; and first and second springs held in said assembly opening areas and having central parts, assembly positions, operating positions and spring forces, said operating position being established in said center of one of said webs between two of said corners of one of said meshes;

a) said first spring including:
   i) a first resilient central part protruding into one of said first meshes, said first resilient central part laterally supporting a first fuel rod to be inserted in said first mesh, and said first resilient central part having a top and a bottom relative to the center line of a fuel rod and two first end strips each adjoining a respective one of said top and bottom;
   ii) four rims including left and right lateral rims disposed on each of said two first end strips, said four rims extending approximately parallel to the center line of the fuel rod and bent away from the first fuel rod;
   iii) first profiled sections each disposed on a respective one of said four rims, each of said first profiled sections having an inner profiled section part supported on said first side surface of said common web in said operating position of said first spring, and an outer profiled section part encompassing said web edges through said assembly opening area;
b) said second spring including:
   i) a second resilient central part protruding into one of said second meshes, said second resilient central part laterally supporting a second fuel rod to be inserted in said second mesh, and said second resilient central part having a top and a bottom relative to the center line of a fuel rod and two second end strips each adjoining a respective one of said top and bottom;
   ii) four rims including left and right lateral rims on each of said two second end strips, said four rims extending approximately parallel to the center line of the fuel rod and bent away from the second fuel rod; and
   iii) second profiled sections each disposed on a respective one of said four rims, each of said second profiled sections having an inner profiled section part supported on said second side surface of said common web in said operating position of said second spring, and an outer profiled section part encompassing said web edges through said assembly opening area;
c) said end strips carrying a protuberance protruding and pointing toward said resilient central part and limiting deflection of each of said springs, and including mutually opposite upper end strips and mutually opposite lower end strips, and one of said first and an adjacent one of said second profiled sections shaped to form four profiled section pairs, in said operating position of both of said springs;
   i) said outer profiled section parts of said first profiled sections to be inserted from said first side surface and said outer profiled section parts of said second profiled sections to be inserted from said second side surface, in said enlarged opening part in said position on said one web laterally displaced relative to said operating position of said springs;
   ii) said outer profiled section parts guided in said opening edges upon laterally displacement of said springs from said assembly position into said operating position; and
   iii) a pair of said profiled section pairs located one above the other and positioned on said end edges upon jointly pushing said springs laterally into said operating position; and
d) one of said springs having at least one part pressed by said spring force into said snap-in opening in said operating position of both of said springs.

34. A spacer of a fuel assembly for a light-water cooled nuclear reactor, the spacer comprising:

webs crossing each other to form first and second meshes for inserting fuel rods having center lines, said webs including common webs between two of said meshes and having centers, and said meshes having corners, said common webs having a first side surface facing toward a first one of the fuel rods and a second side surface facing toward a second one of the fuel rods, said common webs having assembly openings formed therein defining rims of said assembly openings and web edges at said rims, said assembly opening areas having an enlarged opening part at a given position on one of said webs, at least one substantially slot-shaped opening part having opening edges extending transverse to the fuel rods and end edges disposed one above the other, and said webs having snap-in openings; and first and second springs held in said assembly openings and having central parts, assembly positions, operating positions and spring forces, said operating position being established in said center of one of said webs between two of said corners of one of said meshes;

a) said first spring including:
   i) a first resilient central part protruding into one of said first meshes, said first resilient central part laterally supporting a first fuel rod to be inserted in said first mesh, and said first resilient central part having a top and a bottom relative to the center line of a fuel rod and two first end strips each adjoining a respective one of said top and bottom;
   ii) four rims including left and right lateral rims disposed on each of said two first end strips, said four rims extending approximately parallel to the center line of the fuel rod and bent away from the first fuel rod;
   iii) first profiled sections each disposed on a respective one of said four rims, each of said first profiled sections having an inner profiled section part supported on said first side surface of said common web in said operating position of said first spring, and an outer profiled section part encompassing said web edges through said assembly opening area;
b) said second spring including:
   i) a second resilient central part protruding into one of said second meshes, said second resilient central part laterally supporting a second fuel rod to be inserted in said second mesh, and said second resilient central part having a top and a bottom relative to the center line of a fuel rod and two second end strips each adjoining a respective one of said top and bottom;
   ii) four rims including left and right lateral rims on each of said two second end strips, said four rims extending approximately parallel to the center line of the fuel rod and bent away from the second fuel rod; and
   iii) second profiled sections each disposed on a respective one of said four rims, each of said second profiled sections having an inner profiled section part supported on said second side surface of said common web in said operating position of said second spring, and an outer profiled section part encompassing said web edges through said assembly opening area;
c) said end strips carrying a protuberance protruding and pointing toward said resilient central part and limiting deflection of each of said springs, and including mutually opposite upper end strips and mutually opposite lower end strips, and one of said first and an adjacent one of said second profiled sections shaped to form four profiled section pairs, in said operating position of both of said springs;
  i) said outer profiled section parts of said first profiled sections to be inserted from said first side surface and said outer profiled section parts of said second profiled sections to be inserted from said second side surface, in said enlarged opening part in said position on said one web laterally displaced relative to said operating position of said springs;
  ii) said outer profiled section parts guided in said opening edges upon laterally displacement of said springs from said assembly position into said operating position; and
  iii) a pair of said profiled section pairs located one above the other and positioned on said end edges upon jointly pushing said springs laterally into said operating position; and
d) at least a part carrying a protuberance pointing away from a fuel rod and engaging in said snap-in opening in said operating position of both of said springs.

35. A fuel assembly for holding a fuel rod, comprising:

a web having an opening area with an assembly position opening and an operating position opening; and a spring disposed in said assembly position opening, said spring being pressed and displaced laterally from said assembly position opening into said operating position opening when contacted by the fuel rod being inserted along a center line, said spring being snapped into a locking connection with said web in said operating position opening.

* * * * *